(12) United States Patent
Brady

(10) Patent No.: US 8,156,120 B2
(45) Date of Patent: Apr. 10, 2012

(54) INFORMATION RETRIEVAL USING USER-GENERATED METADATA

(76) Inventor: James Brady, Bury (GB)

( * ) Notice: Subject to any disclaimer, the term of this patent is extended or adjusted under 35 U.S.C. 154(b) by 339 days.

(21) Appl. No.: 12/582,774

(22) Filed: Oct. 21, 2009

(65) Prior Publication Data

US 2010/0100543 A1    Apr. 22, 2010

Related U.S. Application Data

(60) Provisional application No. 61/107,526, filed on Oct. 22, 2008.

(51) Int. Cl.
*G06F 7/00* (2006.01)
*G06F 17/30* (2006.01)

(52) U.S. Cl. ...................................................... 707/736

(58) Field of Classification Search .................. None
See application file for complete search history.

(56) References Cited

U.S. PATENT DOCUMENTS

| | | | |
|---|---|---|---|
| 4,839,853 A | | 6/1989 | Deerwester |
| RE41,899 E | * | 10/2010 | Rose et al. .................. 706/46 |
| 2004/0267700 A1 | * | 12/2004 | Dumais et al. .................. 707/2 |
| 2005/0071465 A1 | * | 3/2005 | Zeng et al. .................. 709/224 |
| 2009/0106191 A1 | * | 4/2009 | Gutlapalli et al. .................. 707/2 |

OTHER PUBLICATIONS

The Anatomy of a Large-Scale Hypertextual Web Search Engine http://infolab.stanford.edu/~backrub/google.html, printed Jan. 24, 2010, 19 pages.

Introduction to Modern Information Retrieval, McGraw-Hill Education; New Ed edition (Aug. 1, 1983) ISBN: 0070665265 http://www.amazon.co.uk/Introduction-Information-Retrieval-Computer-Science/dp/0070665265/ref=sr_1_2?ie=UTF8&s=books&qid=1254140945&sr=1-2.

Automatic identification of user interest for personalized search http://portal.acm.org/citation.cfm?id=1135777.1135883, 2006 10 pages.

Using information scent to model user information needs and actions and the Web http://portal.acm.org/citation.cfm?id=365024.365325, 2001 8 pages.

* cited by examiner

*Primary Examiner* — Uyen T. Le
(74) *Attorney, Agent, or Firm* — Jennifer Meredith, Esq.; Meredith & Keyhani, PLLC

(57) ABSTRACT

System, device and method for using user-generated metadata to arrive at a modified search index that emphasizes a relationship between documents selected by a user during a prior search session and salient terms of those documents. An initial search index is modified by adding a synthetic term and a synthetic document to terms and documents that are used to arrive at the elements of the index and by modifying the relevance scores to highlight one or more of the search terms, the synthetic term, and the synthetic document. Synthetic term ties a cluster of related documents together and synthetic document ties terms of these documents together. Synthetic term is not found in any other documents and synthetic document does not belong to any normal corpus of documents. Modified index aids in re-generating prior user choices because it contains artifacts reflecting associations that user perceived between various terms and documents.

36 Claims, 12 Drawing Sheets

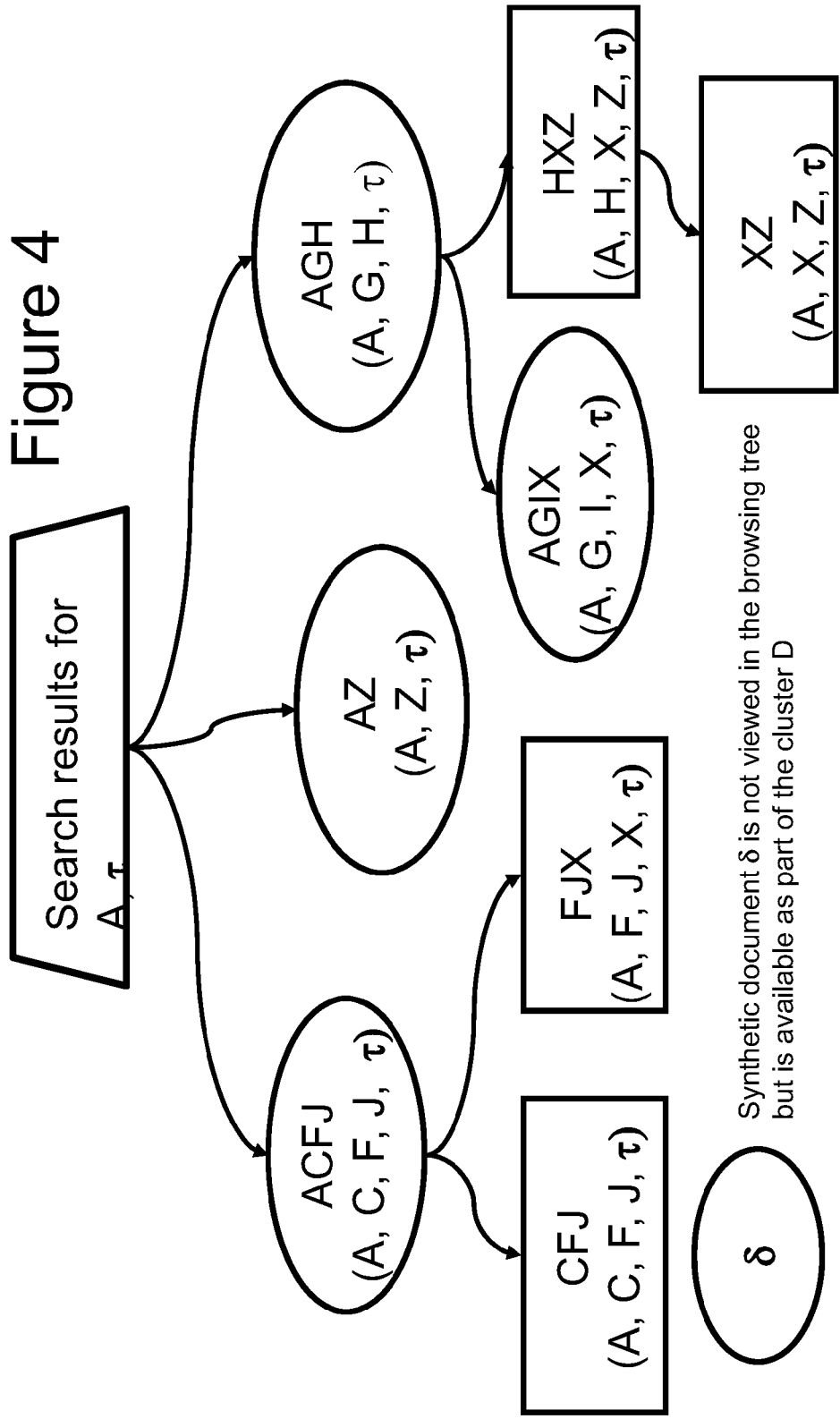

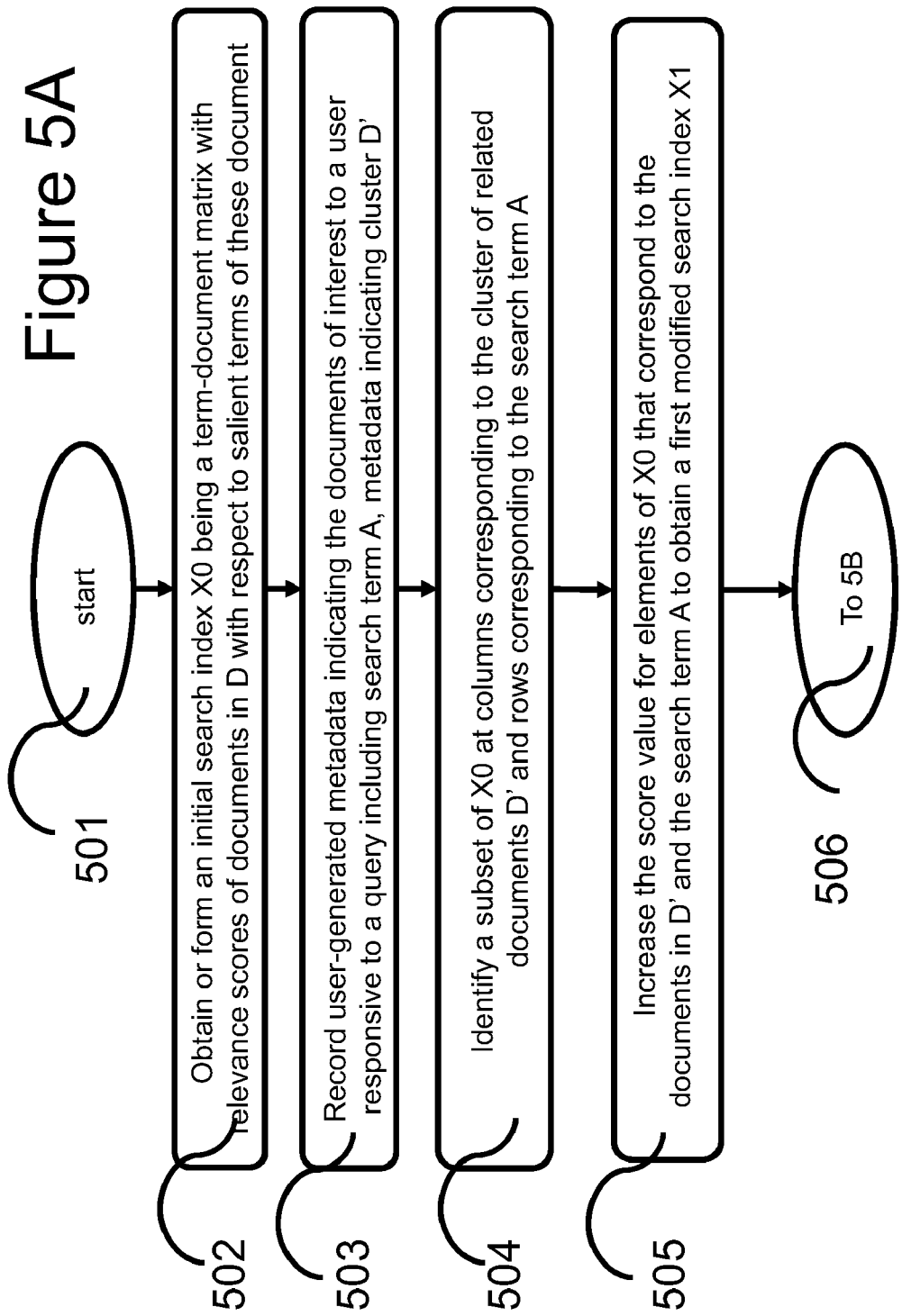

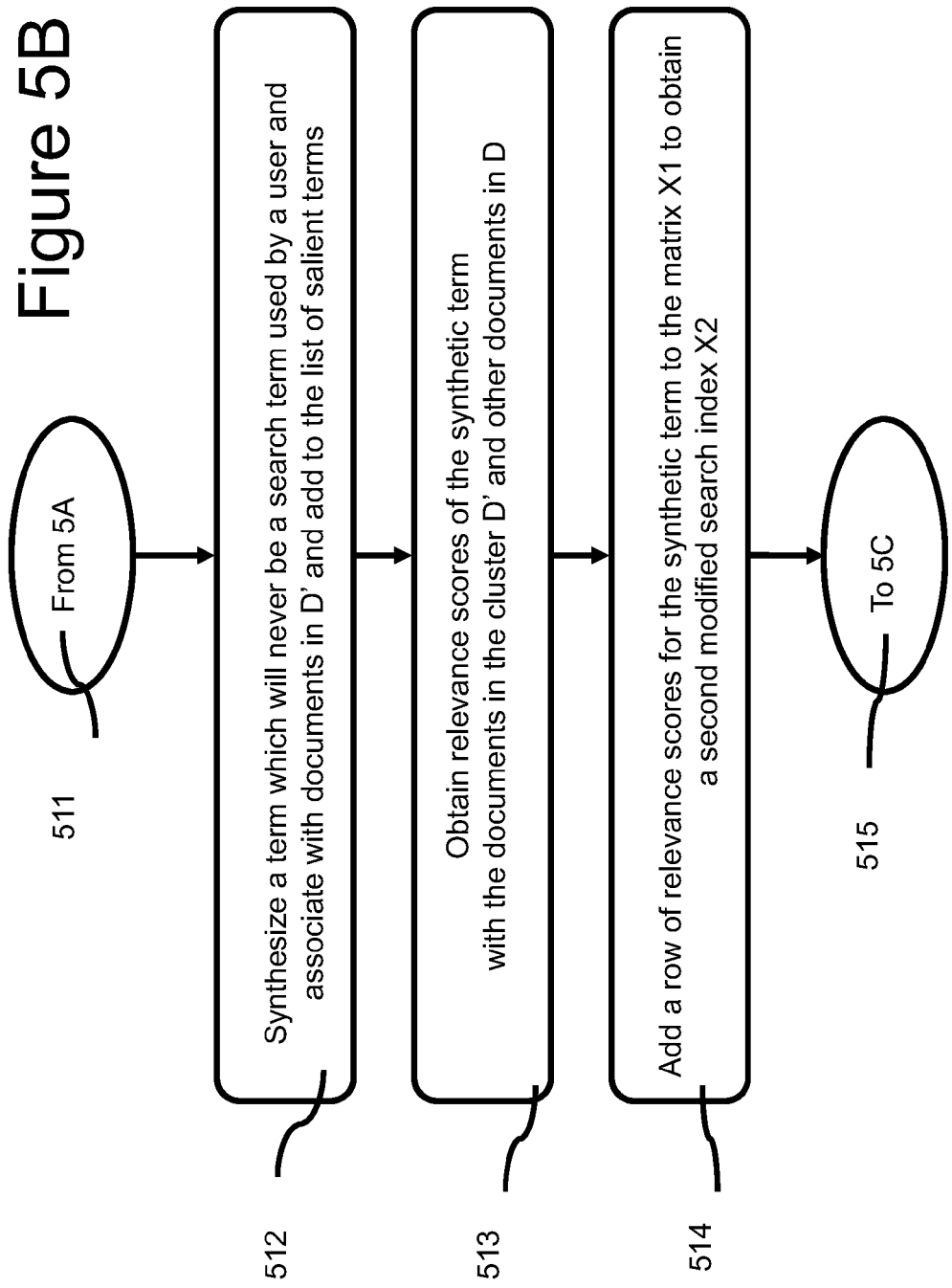

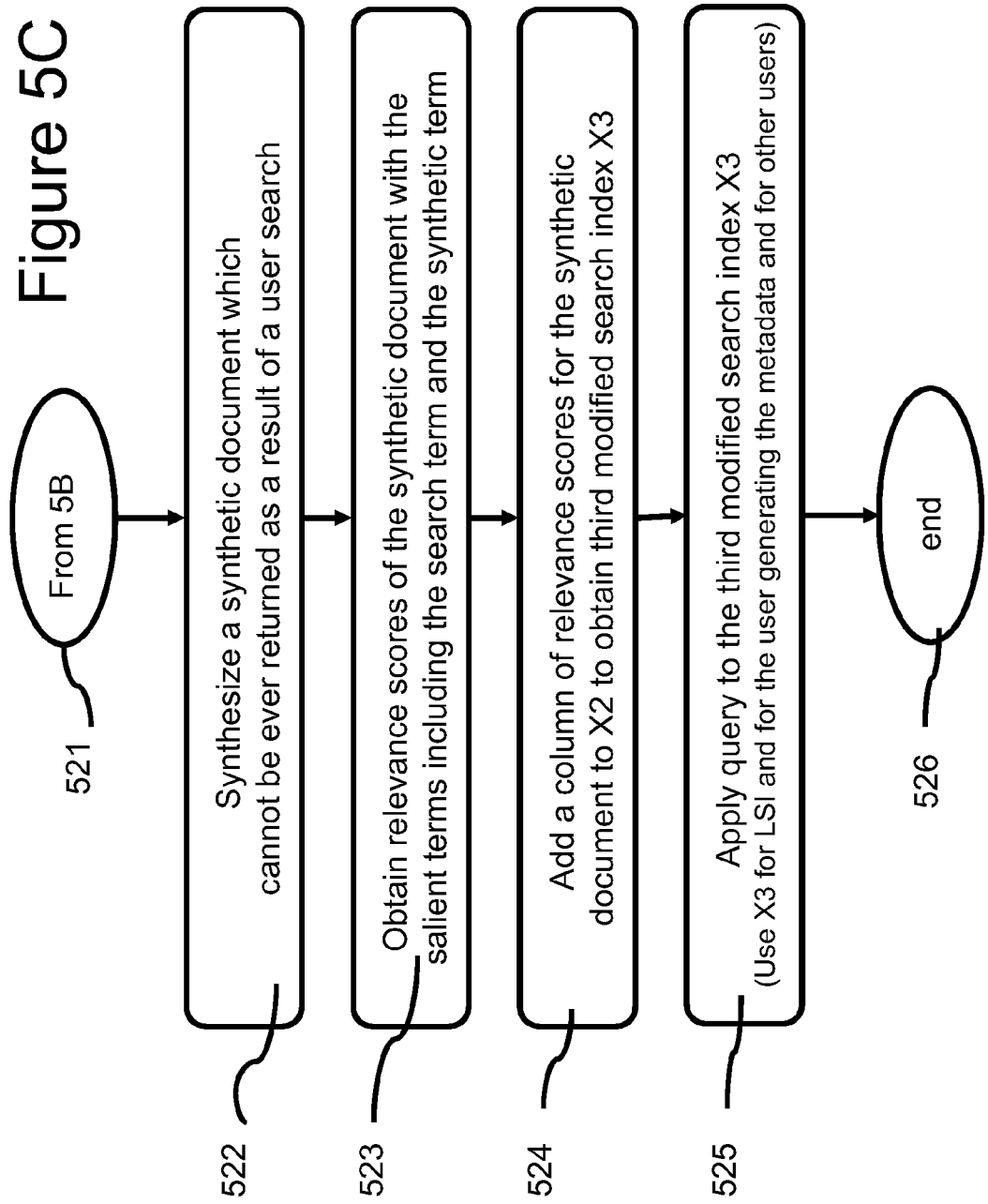

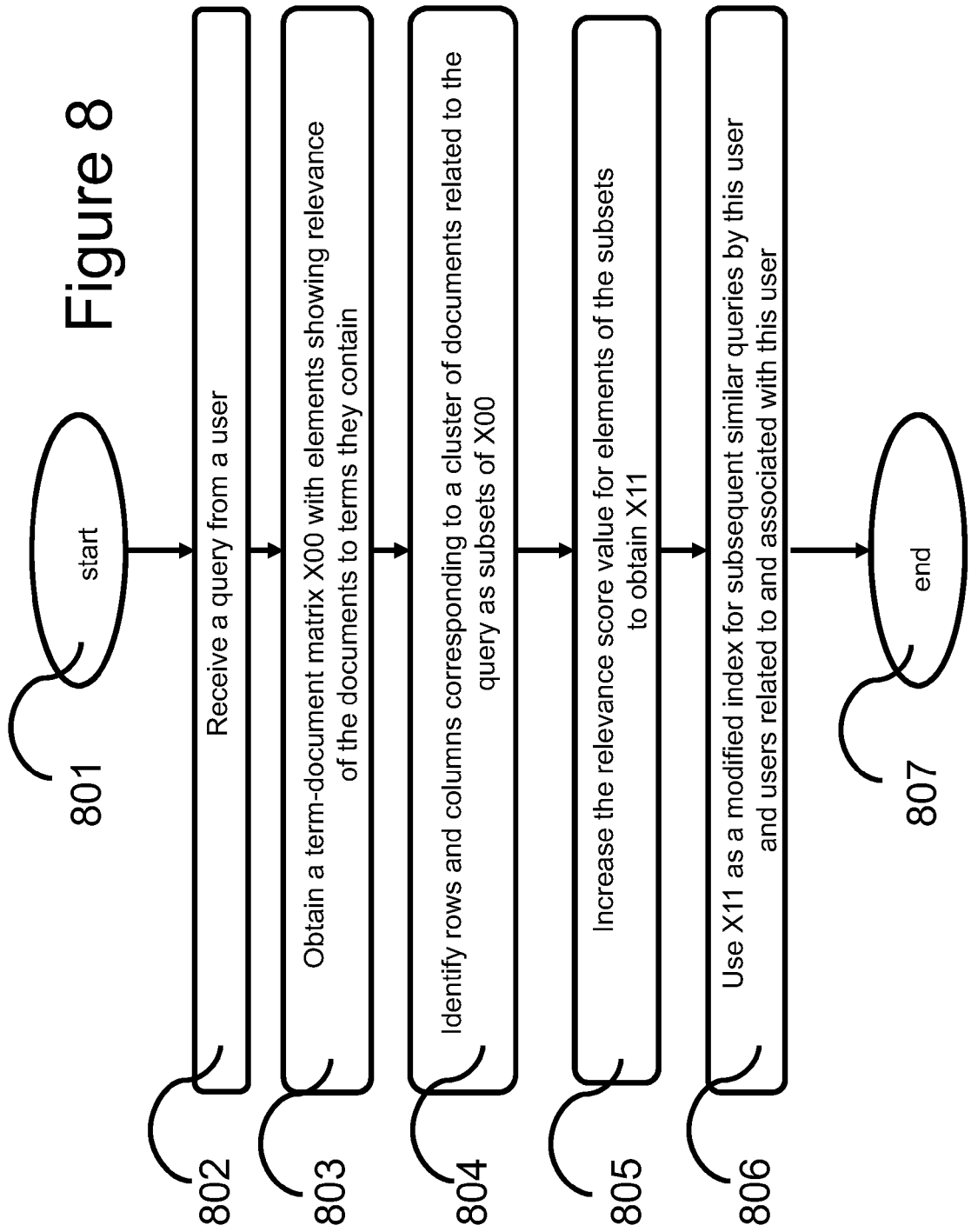

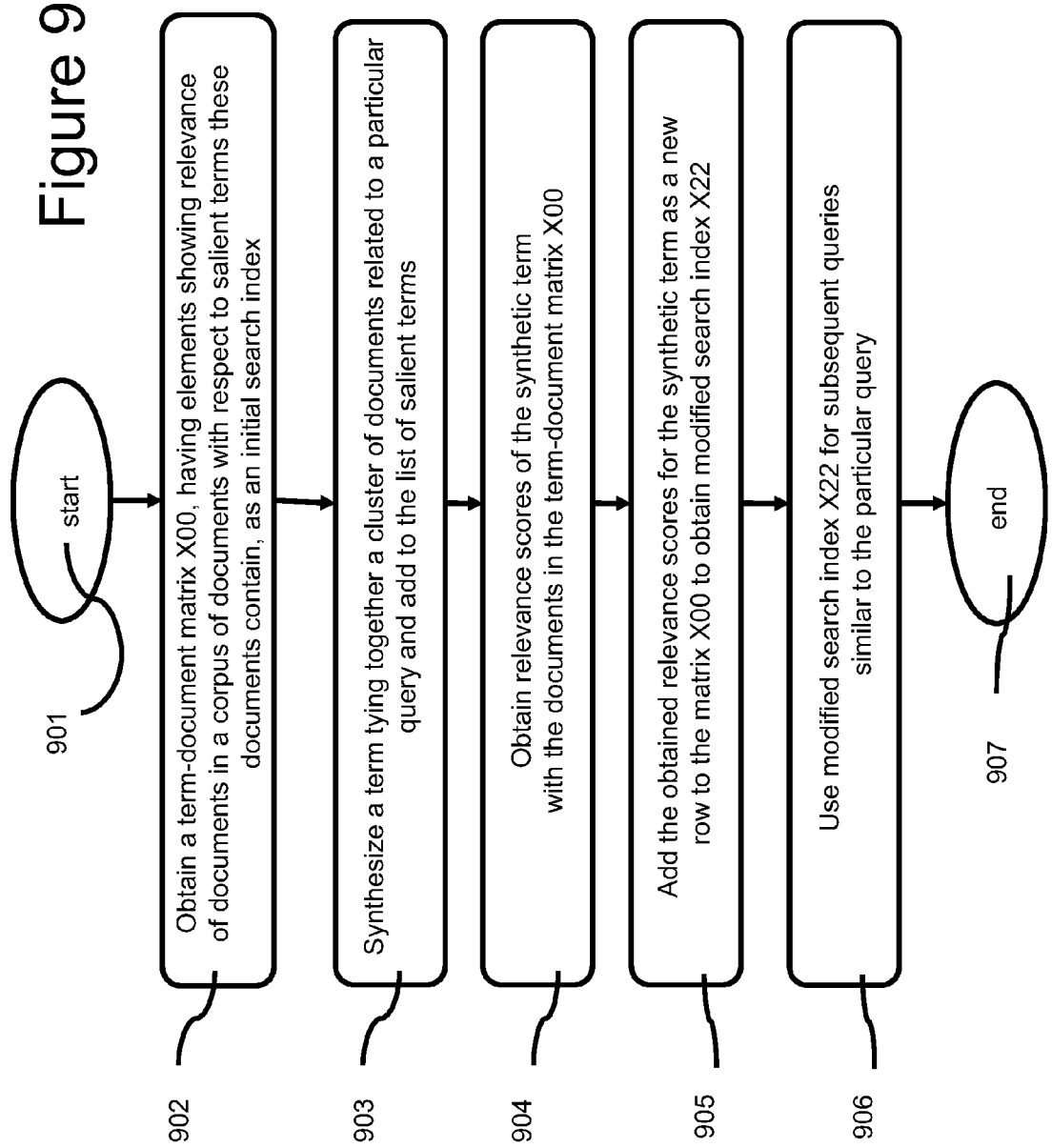

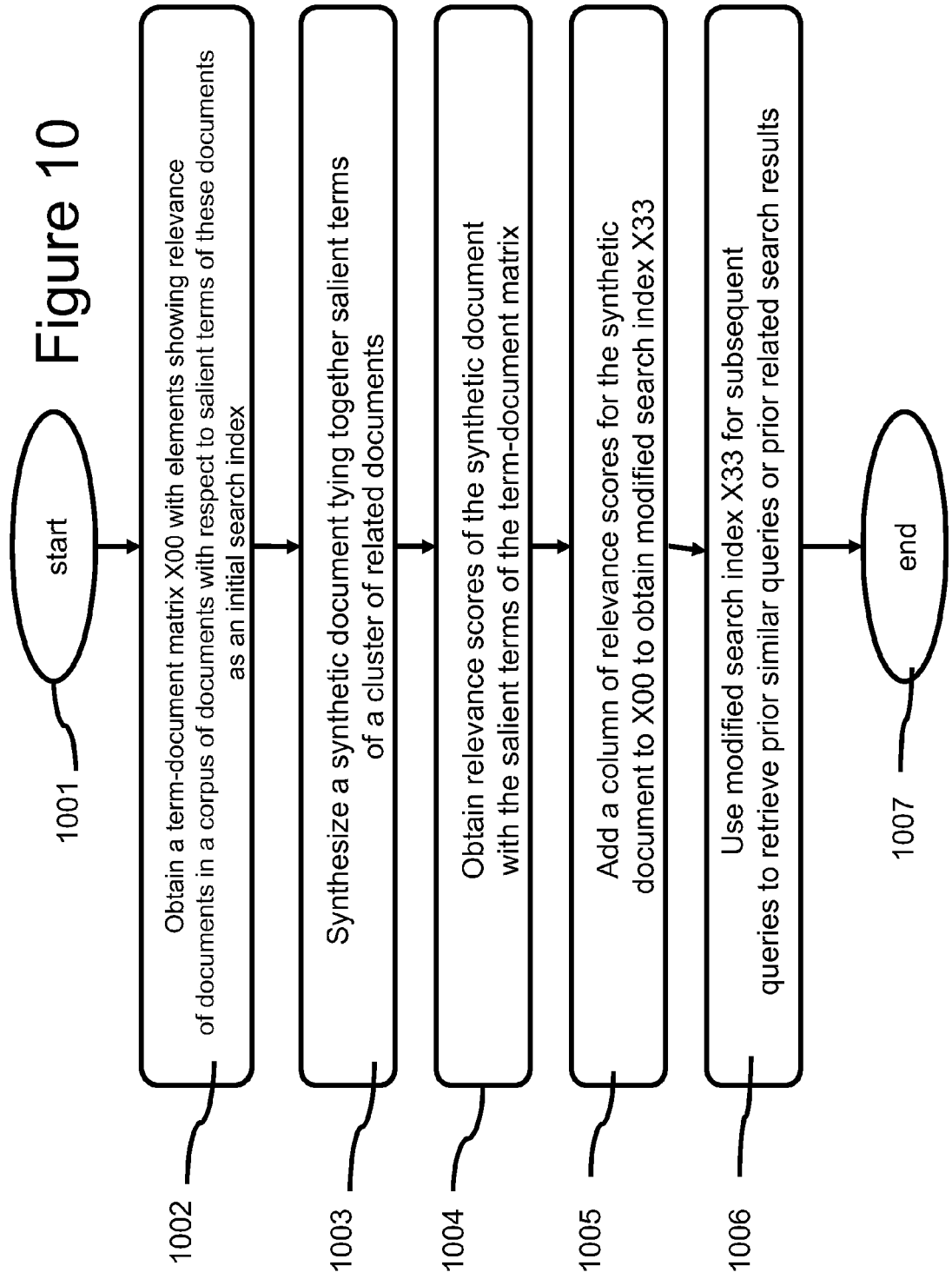

INFORMATION RETRIEVAL USING USER-GENERATED METADATA

CROSS-REFERENCE TO RELATED APPLICATIONS

The present application claims priority to and the benefit of the U.S. Provisional Patent Application No. 61/107,526, filed in the United States Patent and Trademark Office on Oct. 22, 2008, the entire content of which is incorporated by this reference.

BACKGROUND OF THE INVENTION

1. Field of the Invention

The present invention pertains generally to the field of computer-implemented Information Retrieval (IR) including web browsing and, more particularly, to information retrieval using metadata. The present invention further pertains to the indexing operation of a search engine.

2. Description of Related Art

IR is the science of searching for documents, for information within documents and for metadata about documents, as well as searching relational databases and searching of the World Wide Web. IR is interdisciplinary and is based on computer science, mathematics, cognitive psychology, linguistics and statistics among other disciplines. Many universities and public libraries use IR systems to provide access to books, journals and other documents.

Web search engines are the most visible IR applications. A search engine generally operates, in the order of web crawling, indexing and searching. The purpose of storing an index is to optimize speed and performance in finding relevant documents in response to a search query. Without an index, the search engine would scan every document in the corpus, which would require considerable time and computing power. The additional computer storage required to store the index, as well as the considerable increase in the time required for an update to take place, are traded off for the time saved during information retrieval. Search engine indexing collects, parses, and stores data to facilitate fast and accurate information retrieval. Popular engines focus on the full-text indexing of online, natural language documents. Meta search engines reuse the indices of other services and do not store a local index, whereas cache-based search engines permanently store the index along with the corpus. Unlike full-text indices, partial-text services restrict the depth indexed to reduce index size. Larger services typically perform indexing at a predetermined time interval due to the required time and processing costs and agent-based search engines index in real time.

While search indices of most internet access and search engine access providers are proprietary, some companies, such as Yahoo! Corporation of Santa Clara, Calif., permit access to a version of its search index. Build your Own Search Service (BOSS) is an initiative by Yahoo!™ to provide an open search web services platform. The goal of BOSS is to give developers free access to the search index of this internet access provider.

A related area is the field of Latent Semantic Indexing (LSI). LSI is an indexing and retrieval method that uses a mathematical technique called Singular Value Decomposition (SVD) to identify patterns in the relationships between the terms and concepts contained in an unstructured collection of text. The method is called LSI because of its ability to correlate semantically related terms that are latent in a collection of text. The method, also called Latent Semantic Analysis (LSA), uncovers the underlying latent semantic structure in the usage of words in a body of text and how it can be used to extract the meaning of the text in response to user queries. Queries against a set of documents that have undergone LSI will return results that are conceptually similar in meaning to the search criteria even if the results don't share a specific word or words with the search criteria. Because LSI uses a strictly mathematical approach, it is inherently independent of language. This enables LSI to elicit the semantic content of information written in any language without requiring the use of auxiliary structures, such as dictionaries and thesauri.

LSI is not restricted to working only with words. It can also process arbitrary character strings. LSI uses common linear algebra techniques to learn the conceptual correlations in a collection of text. In general, the process involves constructing a weighted term-document matrix, performing a SVD on the matrix, and using the matrix to identify the concepts contained in the text. LSI begins by constructing a term-document matrix, X, to identify the occurrences of the m unique terms within a collection of n documents. In a term-document matrix, each term is represented by a row, and each document is represented by a column, with each matrix cell, $x_{ij}$, initially representing the number of times the associated term appears in the indicated document. This matrix is usually very large and very sparse. Once a term-document matrix is constructed, local and global weighting functions can be applied to it to condition the data. For example, the weighting functions transform each cell, $x_{ij}$ of X, to be the product of a local term weight, which describes the relative frequency of a term in a document, and a global weight, which describes the relative frequency of the term within the entire collection of documents. Dynamic clustering based on the conceptual content of documents is one of the uses of LSI. Clustering is a way to group documents based on their conceptual similarity to each other without using example documents to establish the conceptual basis for each cluster. This is useful when dealing with an unknown collection of unstructured text.

Both IR and LSI are established and actively researched fields.

In IR, retrieving documents from a corpus of data in response to a user query is a known process, around which a great deal of literature exists. Literature in the IR field can be broadly broken into four categories:

1. Text matching algorithms, which estimate the relevancy of a certain term to a certain document, treating each term and document in isolation. The term frequency, inverse document frequency algorithm, as described in Salton and McGill, 1983, "Introduction to modern information retrieval," is one example of text matching algorithms.

2. Document importance algorithms, which consider domain specific heuristics to estimate the documents the user would find to be of higher value independent of text matching algorithms. Sergey Brin and Larry Page's seminal paper, "The Anatomy of a Large-Scale Hypertextual Web Search Engine," covers PageRank™ that is one of the algorithms in this category. PageRank™ is a registered trademark of Google, Inc. of Mountain View, Calif.

3. Semantic association algorithms, which infer associations between and amongst terms and documents in order to extract meaning from the corpus. U.S. Pat. No. 4,839,853, "Computer information retrieval using latent semantic structure," presents one such method.

4. Search using user-generated metadata, which can be further subdivided into: (a) weighted search algorithms and (b) dynamic re-writing.

Weighted search algorithms, in category 4(a), pre-define a set of search topics, and assign each user a vector which designates user's interest level in each of these topics. Searches are effectively performed in parallel across several vertical search engines, one per topic, and the user's interest vector determines the weight given to results from each of these topic-specific searches. Qiu and Cho's paper, "Automatic Identification of User Interest for Personalized Search" describes this arrangement in detail. This paper studies how a search engine can learn a user's preference automatically based on her past click history and how it can use the user preference to personalize the search results.

Dynamic re-writing, category 4(b), builds a richer model of user behavior, and uses this information to first disambiguate and refine search queries, and second to re-rank the search results. An intermediary layer is added in between the user and the search engine that adds differentiating terms to the query, and dynamically re-orders the search results as returned by the search engine. This query-time method is useful for query disambiguation at a coarse level, for example disambiguating between jaguar the animal and Jaguar™ the car manufacturer, but as it exists and operates outside the search engine, the method fails to capture, represent or use the rich index-time context. Jaguar™ is a registered trademark of Jaguar and Rover North America LLC of Mahwah, N.J.

Measuring of user interest is another known area of technology. Both implicit tools, as summarized in D. Kelly and J. Teevan's "Implicit Feedback for Inferring User Preference: A Bibliography," and explicit tools such as StumbleUpon, which allow users to manually rank pages, are used to measure the user interest. StumbleUpon is a proprietary freeware identifying an Internet community that allows its users to discover and rate web pages, photos, and videos. It is a personalized recommendation engine that uses peer and social-networking principles. StumbleUpon chooses which web page to display based on the user's ratings of previous pages, ratings by his/her friends, and by the ratings of users with similar interests. Users can rate a web page with a thumbs-up or thumbs-down.

Suggesting potential "friends" and contacts based on user interests is another known technique, employed by services such as Last.fm™ which is a registered trademark of CBS Interactive Inc., of San Francisco, Calif.

Inferring direct user needs and tracking goals is another known area, covered in papers such as Chi, Pirolli, Chen and Pitkow's "Using Information Scent to Model User Information Needs and Actions on the Web." In this paper, the authors describe two computational methods for understanding the relationship between user needs and user actions. First, for a particular pattern of surfing, they seek to infer the associated need. Second, given an information need, and some pages as starting points, they attempt to predict the expected surfing patterns. The algorithms use a concept called "information scent," which is the subjective sense of value and cost of accessing a page based on perceptual cues.

BRIEF SUMMARY OF THE INVENTION

The above literature does not take into account the context in which a user discovers a document. The mental model that a user builds about the inter-connections between documents is thus rendered useless by not capturing this context. For example, for a user who discovers a web page document or a sound track, making later queries such as "web pages I opened while reading this email," or "tracks I listened to while at home," is impossible. Aspects of the present invention impact the indexing stage of the search process. Therefore, aspects of the present invention provide a personal indexing service that takes the context, in which a user discovers a document, to be significant.

Aspects of the present invention provide a method for collecting user-generated metadata of the user and applying it to improve the future search experience of both the particular user who generated the metadata and that of the wider population. Accordingly, the aspects of the present invention provide systems and methods that are closer to the fourth category of IR methods that uses user-generated metadata.

In various aspects of the present invention, the user-generated metadata is stored either locally, on the user's device, or centrally in some $3^{rd}$ party online repository. To be able to use the metadata across the user population, local storage on the user's device would not be helpful and a $3^{rd}$ party repository would be required. In order to avoid storing a large, unique, personalized corpus for each user, one implementation would store a large, complete, and conventional corpus to be conflated with a small, personalized, per-user corpus. In this implementation, rather than create a separate, for example, Google™ for each user, one Google™ is used plus a set of unique "overlays," one per user, which can be combined to provide a personalized search engine for each user. To help the wider population, the metadata needs to be stored non-locally. In that situation, the metadata indicating the context would be stored in an online repository, owned and operated either by the search engine or by a $3^{rd}$ party.

One aspect of the present invention modifies a term-document matrix that uses relevance scores as elements of the matrix to show the relationship between documents obtained from a search and the salient terms of those documents. Salient terms of a document are words and phrases that are prominent in that document and have a quality of projecting themselves into attention. Salient terms are considered to bear the important information being conveyed by the document. The term-document matrix is modified by adding a synthetic term and a synthetic document to the terms and documents that are used to arrive at the elements of the matrix and by modifying the relevance scores to highlight the search term, the synthetic term and the synthetic document. The resulting matrix, showing the modified relevance scores, aids in re-generating the original search results, or the related queries, because the resulting matrix contains artifacts reflecting the association that the user perceived between various terms and documents. Although the original search tree may not be rebuilt through this process, the process returns documents that may not have been in the first set of links provided by the search, but that the user has demonstrably found useful before. In other words, the original search results and the documents that the user navigated to from the original search results are returned to the user. Further, the user may retrieve his prior queries that are similar to a current query.

The user may navigate to the additional documents by selecting links within the original search results. However, it is noted that the term "link" does not necessarily refer to hyper-text links. Such links are not required by the aspects of the present invention.

Aspects of the present invention do not require a query modification. Rather, the actual backend search index is modified over time to reflect the associations between terms and documents that a user reveals through his behavior. The next time a user performs a search, it is executed as before on the search backend, but the results returned will have "learnt" from what the user found most useful last time.

A corpus of document D that include salient terms T may be searched. When a search is conducted, a cluster of documents, D', which are inter-related, and a cluster of terms, T', which are also inter-related are obtained from the search.

Aspects of the present invention utilize a synthetic search term $\tau$ and a synthetic document $\delta$ to associate the related documents and the related terms that result from the search. The synthetic term and the synthetic document are synthesized by observing user behavior and choices. The synthetic term can be used to associate the documents in a cluster, and the synthetic document to associate terms in a cluster. Therefore, the synthetic term $\tau$ and the synthetic document $\delta$ are the flags with which the clusters D' and T' are marked. Implementation of the synthetic term and the synthetic document will depend on the design of the underlying text matching search engine. In some exemplary aspects of the present invention, $\tau$ has zero similarity with any document that is not in D', and a similarity value of 2 with documents in D'. Likewise, $\delta$ has zero similarity with terms that are not present in T', and a similarity value of 2 with the terms in T'. The magnitude of the similarity value, which is set to 2 as an example, depends on the underlying search engine. The synthetic term and the synthetic document can then be seen as signifying associations which are used for LSI.

Aspects of the present invention permit the users re-find documents more easily.

Aspects of the present invention permit richer user queries by considering metadata rather than mere textual matching on the target documents.

Aspects of the present invention permit latent associations between and amongst terms and documents to be determined for each individual user.

Aspects of the present invention provide for the latent associations established between and amongst terms and documents to be driven by the particular user's observed behavior, rather than being inferred by purely algorithmic means.

Aspects of the present invention permit a semantic context to be built for each individual user, bypassing the need to determine and build a global lexicon for all users.

Aspects of the present invention permit user-generated metadata to be aggregated across one or more users and generalized to the group and corpus as a whole.

Aspects of the present invention permit users discover new documents more easily by considering the aggregate user-generated metadata of the corpus while searching or browsing.

Aspects of the present invention permit users to specifically consider other users' metadata while searching or browsing.

Aspects of the present invention permit the documents that the user found personally useful to be favored in search results.

Aspects of the present invention permit the documents that the user didn't find useful or wasn't interested in to be removed or de-emphasised in search results.

One aspect provides a computer-implemented method for improving information retrieval in response to a query input by a user to a user computer during a browsing session. The method includes collecting user-generated metadata indicative of user choices regarding documents returned responsive to a prior query, storing the user-generated metadata on a storage medium, modifying an initial search index with the user-generated metadata to obtain a modified search index, and storing the modified search index. The initial search index is an initial term-document matrix that has relevance scores as elements. The relevance scores indicate relationship of salient terms of documents in a corpus to the documents in the corpus. The modified search index is obtained by modifying the initial term-document matrix to highlight the relationship between documents related to the user-generated metadata and a subset of the salient terms. This subset may include the search terms. The user-generated metadata includes a set of user-selected documents, a set of salient terms of the user-selected documents and measured user interest in each of the user-selected documents. The user-selected documents may consist of documents selected by one or more users during one or more browsing sessions. The modified search index includes relevance scores pertaining to a synthetic term associating together user-selected documents. The modified search index also includes relevance scores pertaining to a synthetic document associating together salient terms of the user-selected documents. The user-selected documents are selected from among discovered documents returned responsive to the prior query. The synthetic document does not occur in the corpus and the synthetic term does not occur in the documents of the corpus. The query may be applied to the modified search index, and a set of discovered documents that are selected from the corpus are provided to the user at a user interface responsive to the query. The set of discovered documents is further reflective of textual similarity. User interest data may also be used in the obtaining of the modified search index by further modifying the initial term-document matrix according to the user interest data.

One aspect provides a device for improving information retrieval in response to a query by a user. The device includes means for receiving an initial search index showing relevance of documents in a corpus of searched document to salient terms of the documents. This means may be an input and output port for connecting to other devices. The device also includes means for collecting and storing user-generated metadata indicative of user choices during a document search session, that may be another type of port or user-interface peripherals such as keyboard and mouse and a hard disk for storing the collected data. The device also includes means for modifying the initial search index according to the user-generated metadata to obtain a modified search index, that may be a computer processor. The processor may also be a means for applying the query to the modified search index, and a screen or a printer or an output port may serve as the means for providing a set of documents discovered from the corpus of searched documents responsive to the query. User-selected documents are chosen by the user from among the discovered documents, and the modified search index is obtained by modifying the initial search index to emphasize a relationship between the user-selected documents and a subset of salient terms of the user-selected documents.

One aspect provides a repository for collecting user-generated metadata and generating a modified search index. The repository includes an input and output interface for receiving an initial search index, a storage medium for storing the initial search index and for storing user-generated metadata indicative of user choices during a browsing session, and a processor for modifying the initial search index according to the user-generated metadata to generate the modified search index. The modified search index is generated by modifying the initial search index to emphasize a relationship between user-selected documents and a subset of salient terms of the user-selected documents. The user-selected documents are chosen by a user from among documents returned to the user during the browsing session.

BRIEF DESCRIPTION OF THE DRAWINGS

FIG. 4 shows a browsing tree with synthetic document, δ, according to the aspects of the present invention.

FIG. 5A, FIG. 5B and FIG. 5C show a flowchart of an exemplary operation method, according to the aspects of the present invention.

FIG. 8 shows a flowchart of a method for obtaining a modified search index by using the search term, according to the aspects of the present invention.

FIG. 9 shows a flowchart of a method for obtaining a modified search index by using a synthetic term, according to the aspects of the present invention.

FIG. 10 shows a flowchart of a method for obtaining a modified search index by using a synthetic document, according to the aspects of the present invention.

DETAILED DESCRIPTION OF THE INVENTION

Figure 1:
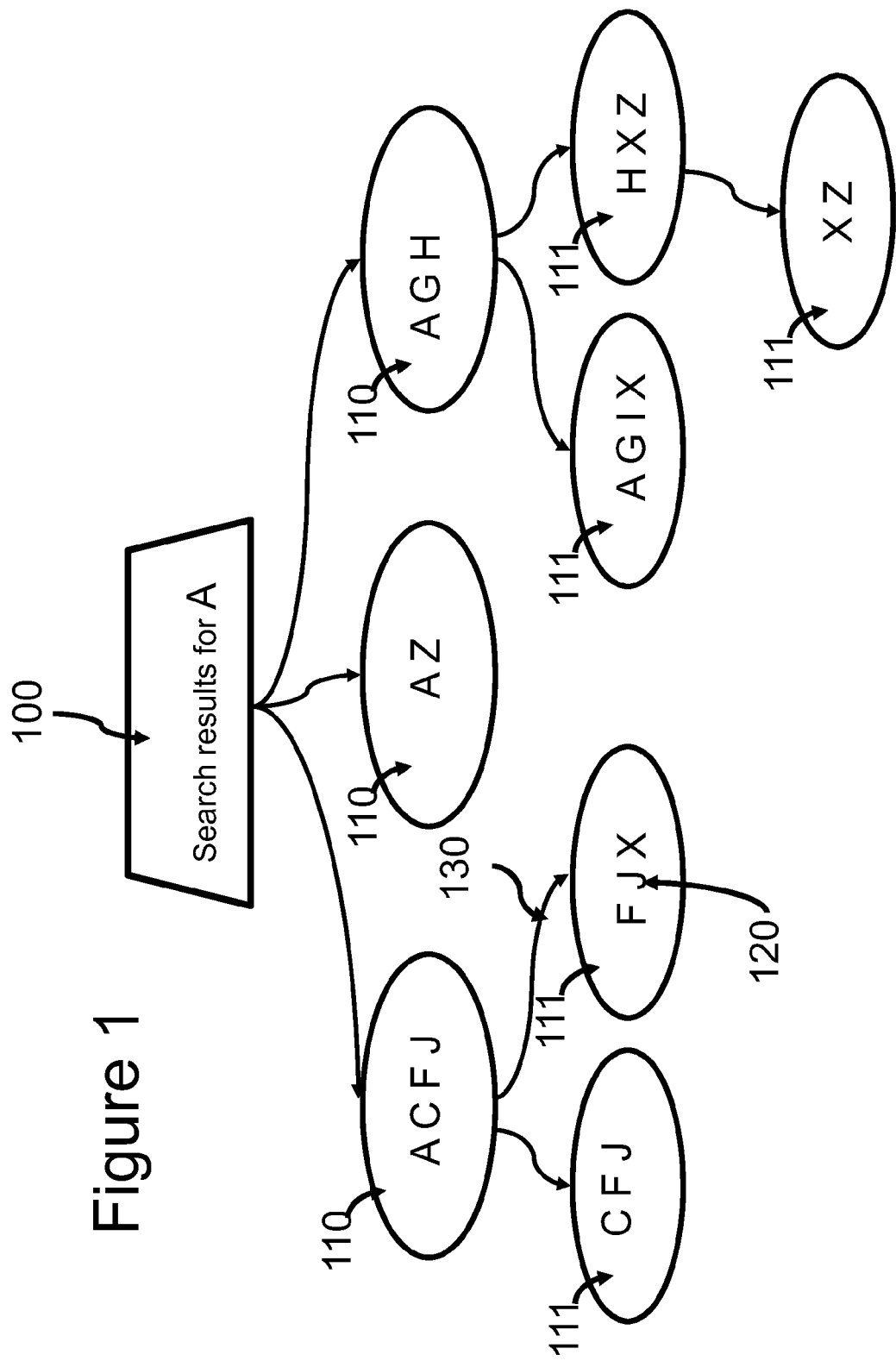
FIG. 1 shows a tree diagram for a browsing session, according to aspects of the present invention.

Aspects of the present invention utilize user-generated metadata to identify the documents selected for viewing by the user from among the documents presented by a search engine and the documents subsequently arrived at by the user through following links within the documents presented by the search engine. Aspects of the present invention, thus, provide improved recovery of documents that were previously arrived at by entering a search term, or a query, and selecting links from within the presented documents to other documents.

The improved recovery is obtained, in some aspects, by introducing synthetic terms or synthetic documents that tie together a group of documents that are related in some fashion or a group of related terms. As a result, and if the documents are tied together, for example, according to a certain time interval, later recovery of these documents responsive to a query such as "web pages I opened while reading this email," becomes possible. Further, by tying together the terms, later recovery of previous similar queries becomes possible.

As explained above, a search engine uses a search index to conduct a faster search in response to a query by a user. A search index may be obtained from a search provider, such as Google™ or Yahoo!™, that creates and maintains the search index, or it may be developed by an entity implementing the aspects of the present invention and would reside on a repository controlled by this entity. The initial search index, thus obtained or formed, provides a substrate on which the aspects of the invention are built. This initial search index is, so to speak, a "vanilla" document index before modifications are applied to it and access to this initial search index is required for the full operation of some aspects of the invention. In alternative aspects of the invention, it may be possible to use an index such as Yahoo! BOSS as an outsourced replacement for the initial search index. However, the application programming interface (API) of any externally provided search index must be such that it permits addition of synthetic terms or documents into the index. Aspects of the present invention modify the initial search index according to various methods and based on the meta-data generated by the user during previous searches by the user or other users. Therefore, wherever the initial search index resides, it should be available for modifications by the systems of the present invention and according to the method of the present invention. Per-user metadata may be stored as an overlay and conflated with the basic or initial search index.

At one level of abstraction, each user has his own initial search index, and his own modified search indices which are created by his particular derived browsing behavior. The initial search index and the modified search indices are created on the index-side either by crawling web pages or by tracking user behavior. When a query arrives, the query is passed along to one of the modified search indices. The query remains unmodified.

However, it may be prohibitively expensive to store a separate initial search index for each user. Therefore, a single canonical initial search index may be used and conflated with a personalized synthetic term or document stored for each user. Then, it is not necessary to store a separate initial search index for each user. The synthetic term or document ties together and associates together the documents pertaining to the particular user.

A query entered into a user computer is sent to a repository, where past user search data and one or more implementations of the methods of the present invention reside. The repository may be located on the user computer, at the search engine or may be a stand-alone entity independent of both the user computer and the search engine operator. At the repository, the initial search index that would be usually used for the search has been subjected to one or more modifications to form a modified search index. The search indices, initial or modified, are document-term matrices used to conduct the search. Therefore, these modified matrices are in one sense the search engine. They are what the query is run against. The initial term-document matrix, or the initial search index, is the matrix that would normally be used. The modified term-document matrices are replacements for the initial matrix that are arrived at by methods and systems of the present invention. The unmodified query would be run against the modified term-document matrices.

FIG. 1 shows a tree diagram for a browsing session, according to aspects of the present invention.

An example of a search tree resulting from a search, such as a web browsing session, is provided as an introduction to the description of aspects of the present invention. The aspects of the present invention related to the use of user-generated metadata and the types of user-generated metadata are described with respect to FIG. 1.

While web browsing is cited as an example of the type of search, the search tree of FIG. 1 could equally result from a visit to a library, looking at some books referred by the librarian first, and following the leads in each of those books to other books.

In FIG. 1, during a search on the internet, a user is looking for web pages relevant to the search term "A." The search term "A," for example, may be "Automobile" or "Arrows" or may be a phrase such as "automobiles displayed in car shows." The user performs a web search and follows the links that are presented to him, discovering a number of web pages in the process. FIG. 1 shows a decision tree for this search process, with trapezoidal node 100 representing the original results presented to the user, oval nodes 110, 111 representing web pages or documents selected by the user, letters 120 representing the document name and lines 130 representing followed links from one web page or document to a link within that web page or document to arrive at a next web page or document.

The trapezoidal node 100 indicating "search results for A" corresponds to the root node, and several outgoing edges from a single node means the user clicked on more than one link on that page. Some of the documents 110, in the search tree, are listed in the original search results and may be arrived at from the node 100. Other documents 111 do not include the search term and are not listed on the node 100 and may not be arrived at directly from node 100. The document names 120 are selected to indicate the salient terms within the document. For example, document FJX includes the salient terms F, J and X.

In one example, the node 100 showing "search results for A" is the page, or pages, with the list of results that appear after the term "A" has been entered in the search bar on a Google™ search screen. The actual list of outgoing links may be presented in many pages from the view point of the user. For simplicity, we refer to them as the result page. This result page 100 usually contains hundreds of links. Yet, the user may click only on some of these links 110. In FIG. 1, the user has clicked on the links corresponding to the documents ACFJ, AZ, and AGH. Because the names of the documents are selected to represent the salient terms that each includes, all of these documents 110 include the search term "A." Each of these documents, web pages, or links 110, in turn includes links to a number of other documents, web pages or links. In FIG. 1, after going to the document ACFJ, the user has clicked on the links 111 for the documents CFJ and FJX. According to FIG. 1, either the document AZ did not contain any links of its own or the user did not follow any of the links provided within AZ. After going to the document AGH the user clicked on the links AGIX and HXZ. The link HXZ does not include the search term "A" and would not have resulted from the user's initial search yet the user decided to follow a path to this link. The document HXZ provides a link to document XZ, which does not include the search term "A" either. Yet, the user decided to follow the link to XZ from HXZ.

Without the provisions of the aspects of the present invention, the browsing tree thus constructed is lost once the user exits the system. The system has no way of remembering and reproducing the links 110, and particularly the links 111, that the user decided to follow if the user later begins a new search from the search term "A" again.

Note that the terms "document," "web page" and "link" may be used interchangeably within the context of the current specification.

Example search results at the root node are additionally provided in Table 1.

TABLE 1

Search Results Corresponding to FIG. 1

| Document Name | Document terms | Relevance Score |
|---|---|---|
| ACFJ | A, C, F, J | 50 |
| AZ | A, Z | 30 |
| AGH | A, G, H | 10 |

As mentioned above, the documents are named in a manner to provide a hint to the salient terms of the document. For example, the document shown in FIG. 1 as document ACFJ includes the salient terms A, C, F and J.

The scores provided in Table 1 for each document d provide some measure of the relationship between the document and the search term "A" or relevance of the document d to the search term "A." According to Table 1, the document ACFJ may, for example, have a high frequency of occurrence of the search term "A." The relevance score may be based on other measure, such as a relative frequency of occurrence normalized for the size of the document, or frequency of occurrence in a specific part of the document. Whatever the criteria for the relevance scores listed in Table 1 is set to be, this criteria is best met by the document ACFJ and worst met by the document AGH.

The relevance score of a document does not necessarily convey the level of interest of the user in the document. The level of interest of the user in a particular document d is shown with the parameter i(d). The interest level i(d) and the relevance score may completely coincide, may have overlapping indicators and be correlated to some degree or they may be independent of each other.

In one alternative, the scores shown in Table 1 may indicate the level of interest of the user in a particular document d that is shown by i(d) and may be measured or estimated by methods such as those presented by Qiu and Cho's paper, "Automatic Identification of User Interest for Personalized Search" that studies how a search engine can learn a user's preference automatically based on the user's past click history.

The corpus of all the documents searched is denoted D, the set of salient terms of the documents in corpus D is denoted T. D' and T' denote subsets of D and T as set forth below. D' and T' are subject to change.

As a result of the search depicted in FIG. 1, three sets of information become available: the documents that were discovered, the terms in the documents and the user interest guiding him to click from document to document. The discovered documents are documents selected by the user or user-selected documents of a browsing session. As such, in the exemplary case of FIG. 1, the user-generated metadata includes:

1. The set of discovered documents d, or discovered links or web pages, denoted by D'. In FIG. 1, for example, the set D' includes the documents ACFJ, AZ, AGH, CFJ, FJX, AGIX, HXZ and XZ or D'={ACFJ, AZ, AGH, CFJ, FJX, AGIX, HXZ, XZ}.

2. The set of salient terms for these documents, T'. In this case, T' contains the search term "A" entered at the root node in the browsing tree. In FIG. 1, for example, the set T' includes the terms A, C, F, J, Z, G, H, X, I, and Z or T'={A, C, F, J, Z, G, H, X, I, Z}. However, in one of the examples reviewed below, the set T' includes only the search term "A" entered at the root node and not the other salient terms found in documents D' or T'={A}. This is so because construction of T' may be to some extent arbitrary. T' usually consists of a cluster of terms that accurately reflect a particular browsing session. As web pages, including even the more relevant web pages, contain so much detritus, forming the set of salient terms T' from just the initial search term and a synthetic term that is later discussed, may provide the better choice in some situations.

3. The measured interest i of the user at each web page d belonging to the set of web pages D' which is shown as i(d), $\forall d \in D'$. Table 3 shows examples of user interest corresponding to each of the documents discovered during the search.

At least the above mentioned three types of user-generated metadata are preserved and stored by the aspects of present invention.

As explained above, although a conventional spidering search engine could have discovered the set of documents, D', only documents 110 directly matching "A" will be returned when the search is re-conducted from the search engine's search page. In other words, if the user returns to the search box for Google™ and re-enters "A," a set of documents or links are presented to him that include ACFJ, AZ and AGH. At the same time, there is no guarantee that the user finds his way back to, for example, FJX or XZ during this second search. If the user follows different links during the second search session, he will not re-find FJX or XZ.

The aspects of the present invention treat the fact that the user discovered a particular set of documents from an initial search term "A" as significant. The significance of the particular decisions made by the user and the particular path that is followed is preserved in various manners.

Figure 2:
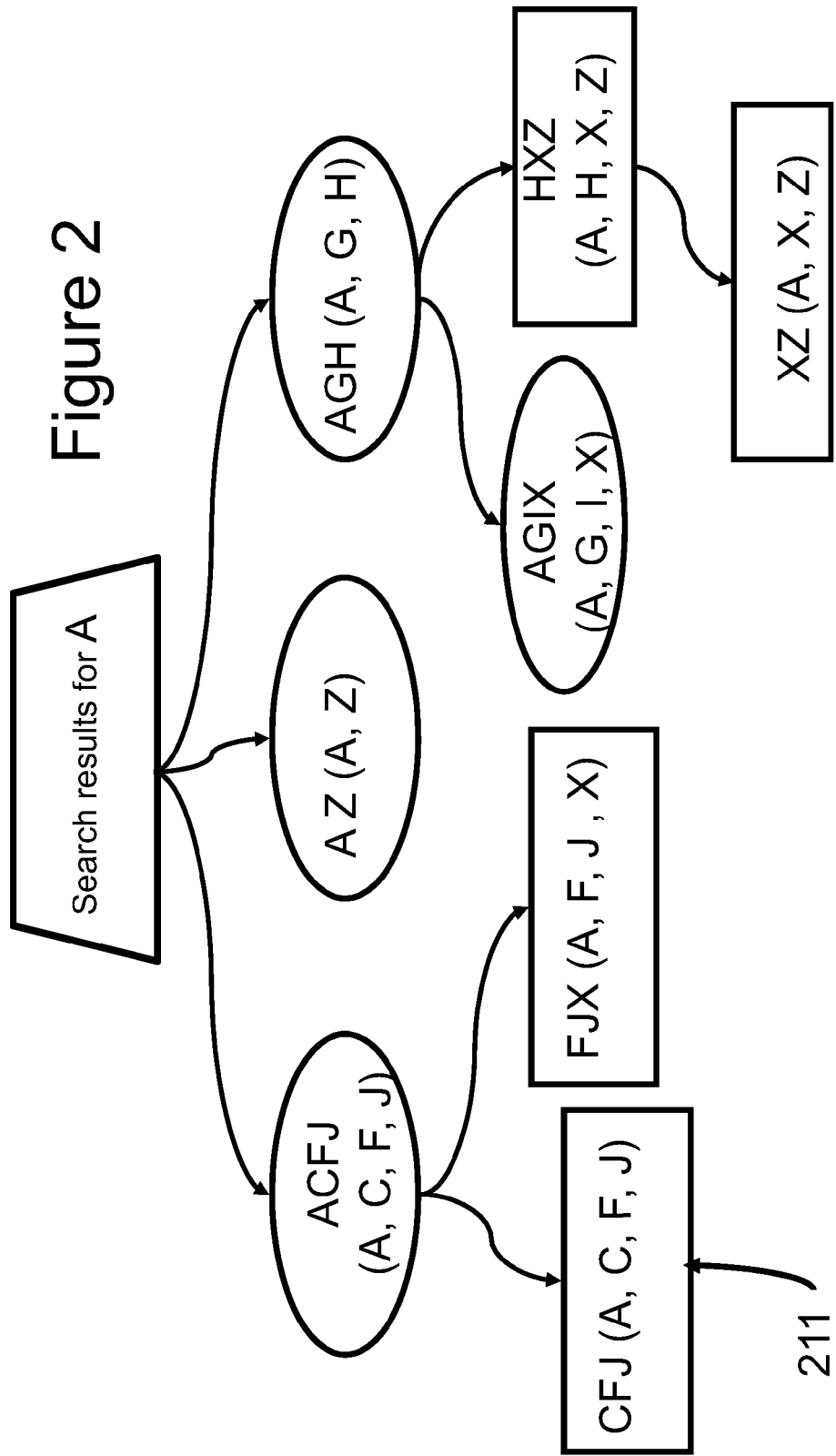
FIG. 2 shows a browsing tree with inferred document-term associations, according to the aspects of the present invention.

FIG. 2 shows a browsing tree with inferred document-term associations, according to the aspects of the present invention.

In one alternative, this significance of the particular decisions made by the user can be reflected by adding "A" as a relevant term to all the documents in the cluster of discovered and viewed documents, D'. This is shown in FIG. 2, where the rectangular nodes 211 have been updated with the extra term, "A".

Example search results, corresponding to FIG. 2 are given in Table 2.

TABLE 2

Example search with inferred document-term associations

| Document Name | Document terms | Relevance score |
|---|---|---|
| ACFJ | A, C, F, J | 50 |
| CFJ | A, C, F, J | 50 |
| FJX | A, F, J, X | 40 |
| AGIX | A, G, I, X | 40 |
| HXZ | A, H, X, Z | 30 |
| AZ | A, Z | 30 |
| XZ | A, X, Z | 20 |
| AGH | A, G, H | 10 |

When the user searches for "A" again in the future, all the results that the user himself associated with "A" can be returned, rather than, or in combination with, the documents that the scoring algorithm associates with "A."

In other words, as a result of associating the search term "A" with all the documents in the set D', that represents the links selected by the user, all of these documents would be identified by the search engine in a subsequent search by the user for the same search term "A."

Another piece of data that may be used to improve the information provided by Table 2 is the user interest data i(d). By considering the interest data, i(d), the web pages the user found most valuable can be returned directly, even if these web pages were originally discovered only after clicking through several links. This interest data could be built from such things as time on page, amount of scrolling, bookmarking, tagging, manual rating and the like. Supposing that the web page originally associated with the terms "X" and "Z" was the most interesting to the user, example search results would look similar to Table 3.

TABLE 3

Example search with inferred document-term associations and interest boosting

| Document Name | Document terms | Relevance score | User interest level i(d) |
|---|---|---|---|
| XZ | A, X, Z | 80 | 0.8 |
| AZ | A, Z | 60 | 0.7 |
| HXZ | A, H, X, Z | 50 | 0.4 |
| FJX | A, F, J, X | 40 | 0.3 |
| AGIX | A, G, I, X | 30 | 0.2 |
| ACFJ | A, C, F, J | 20 | 0.2 |
| CFJ | A, C, F, J | 20 | 0.2 |
| AGH | A, G, H | 10 | 0.1 |

This example shows that saving the context when a user discovers a document has utility to that user. The search results given in Table 3 deliver to the user the web pages the user found most useful for the term he originally searched for. The data preserved in Table 3 is far more useful than the data available from Table 1 and FIG. 1, where the user would have to successfully re-navigate through three links to get to the same information.

The aspect of the invention shown in FIG. 2 marked the links or documents belonging to the cluster D' by associating the search term "A" with all of these documents. This method guarantees the return of even those documents that did not initially include the search term "A."

This method, however, also returns all the other documents including "A" that were not initially selected by the user. In other words, the user does not lose these documents but has to re-find them among possibly a large number of documents. This issue is addressed in the next aspect of the present invention that is shown in FIG. 3.

Figure 3:
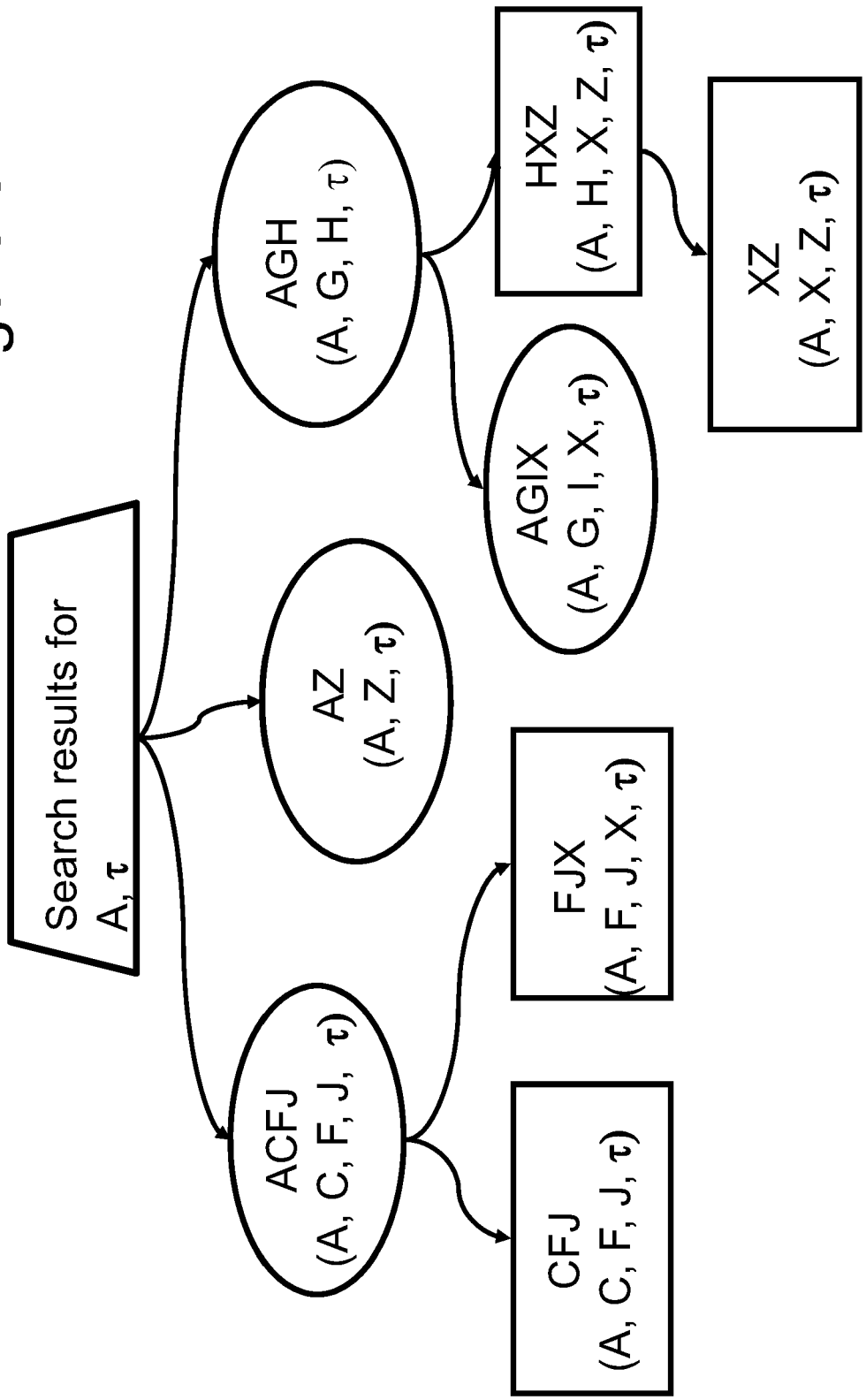
FIG. 3 shows a browsing tree with synthetic term, τ, according to the aspects of the present invention.

FIG. 3 shows a browsing tree with synthetic term, $\tau$, according to the aspects of the present invention.

The web pages in the set D' are latently associated on a more abstract level. The user, by creating this particular document tree, clearly associates the pages in some way; this association can be reflected by adding a unique synthetic term $\tau$ to all the documents in this cluster, as shown in FIG. 3.

The inclusion of the unique, abstract term $\tau$ allows for queries such as "web pages from the same browsing session," which are non-trivial, to perform and achieve the correct result. The synthetic term is capable of marking a group of documents that are related according to any one or more of a number of parameters, whether the parameters are user-generated or otherwise. For example, the synthetic term may be used to mark the documents from a single browsing session or from a certain period of time.

The synthetic term $\tau$ added to the documents of D' is different from the search term "A" in that the synthetic term may be synthesized such that it does not occur naturally and normally in the documents that are returned by the search engine. As such, the synthetic term $\tau$ would create a unique identifier or marker for only those documents that were clicked on and followed by the user and no other documents. This aspect of the present invention returns all the documents in the set D' and not any additional documents because no document in its search space would contain this term naturally.

The synthetic term $\tau$ may be synthesized to reflect the latent semantic association between the documents in D'. Latent semantic association or latent semantic analysis is an automatic mathematical and statistical technique for extracting and inferring relations of expected contextual usage of words in passages of discourse. It takes as its input only raw text parsed into words defined as unique character strings and separated into meaningful passages or samples such as sentences or paragraphs.

The set of documents that were of interest to the user and were viewed by him form a cluster of related documents. Documents in a cluster may be related according to some other criteria. When a set of documents are determined to be associated such that they indicate a cluster, then it may be assumed that some imaginary, unique term was present in each of those documents and in no other. This imaginary term ties the documents together and represents the association between the documents even if they didn't necessarily have any real terms in common. The synthetic term $\tau$ is synthesized to establish a tie between only certain documents. Therefore, for example, when D'={ACFJ, AZ, AGH, CFJ, FJX, AGIX, HXZ, XZ}, then τ is synthesized to be a term that is found in only the documents of D' and in no other document in the space, or corpus, of available documents.

FIG. 4 shows a browsing tree with synthetic document, δ, according to the aspects of the present invention.

Finally, the salient terms for this document cluster D' are also inter-related. This interrelationship is reflected by the addition of a synthetic document, δ, to the cluster D'. However, as explained below, the synthetic document does not appear in the browsing tree shown in FIG. 4 and is not known to the user. Accordingly, the browsing tree of FIG. 4 is similar to the browsing tree of FIG. 3 when viewed by a user.

The synthetic document δ is synthesized to include, for example, the synthetic term τ or the search term A or both. As it is a synthetic document, created purely to reflect the association between A and τ, the user does not have to ever see the synthetic document and this document does not appear in the browsing tree. Because the synthetic document relates some of the salient terms together, the user who enters a query, has the option of retrieving similar queries previously submitted. The synthetic document relates the similar queries together and can return previous search terms that had yielded documents that the current search terms would yield.

FIG. 5A, FIG. 5B and FIG. 5C show a flowchart of an exemplary operation method, according to the aspects of the present invention.

A rather detailed implementation of the method of the present invention is described below that provides a specific example. Both generalizations of the described implementation and alternatives tied to particular domains may be deduced from the exemplary implementation that is described.

An initial search index is modified according to methods of the present invention. The method is divided between FIG. 5A, FIG. 5B and FIG. 5C. It begins in FIG. 5A, continues through FIG. 5B and ends in FIG. 5C. A modified search index is obtained at the end of each drawing that may be used as a stand-alone search index or further modified to generate the next and further modified search index.

The method may be implemented at a user computer in communication with a search engine provider or at a 3$^{rd}$ party repository in communication with both the user computer and the search engine provider.

The method begins at 501. At 502 an initial search index $X_0$ is either formed internally or obtained from a search engine provider. The initial search index is an initial term-document matrix with relevance scores of documents in a corpus D of documents with respect to salient terms T of these documents as elements of the matrix. At 503, user-generated metadata is recorded. The user-generated metadata indicates the documents of interest to a particular user or to a group of users. The user generated metadata generally indicates a set or cluster of documents D'. This cluster includes the documents returned to the user initially and the documents arrived at by the user as he clicks on the links included in the initial documents. The cluster D' may pertain to a particular session or be demarcated by some other criteria. The cluster D' may be obtained through vector dot product methods that show the degree of relatedness of two vectors. In this example, the documents D' are selected by the user from among the documents returned in response to a user query including the search term A. At 504, a subset of $X_0$ is determined that corresponds to the elements at columns corresponding to the cluster D' of related documents and rows corresponding to the search term A. Alternatively, the subset may be selected from elements at rows corresponding to a set of salient terms T' in documents of cluster D'. However, selecting the row corresponding to the search term or search terms provides one exemplary choice. At 505, the values for elements of the subset, determined at 504, are increased to obtain a first modified search index $X_1$. Accordingly, in this modified matrix $X_1$ the scores pertaining to the search term A and the documents in the cluster D' are higher than the scores showing the relevance of other documents and other terms. The first modified matrix $X_1$ may be used without further modifications as a modified search index that highlights the association between search term A and the documents in cluster D' that the user selected from among the documents returned responsive to the query. A subsequent query for A, when submitted to this first modified search index $X_1$, has a higher likelihood of returning the same documents D' that were selected by the user during the first query for A. At 506, the method moves to FIG. 5B.

In FIG. 5B, at 512, a synthetic term is synthesized that is not a search term that will be used by the user or any other user. This synthetic term associates the documents in D' together and is added to the list of salient terms T. At 513, the relevance scores of the synthetic term with the documents in the corpus D, which includes the cluster D', are obtained. Because the term is synthetic, it can be synthesized to have the desired relevance score. For example, the relevance score of the synthetic term and those documents in D that are not in D's is set to 0. The relevance score of the synthetic term with the documents in cluster D' is set to a number indicating a high level of relevance. At 514, a row is added to the matrix $X_1$ to include the relevance scores of the synthetic term and the documents in D to generate a second modified search index $X_2$. The second modified search index is again a term-document matrix that is obtained by modifying the elements of the first term-document matrix and, in this case, adding a row of elements to it. Again, the second modified search index obtained here may be used without any further modifications. A query for A and the synthetic term, submitted to the second modified search index $X_2$, returns the documents in D'. At 515, the method continues on FIG. 5C.

In FIG. 5C, at 522, a synthetic document is synthesized which cannot be ever returned as a result of a user search but is related to the cluster of related documents and ties in to the synthetic term and the other salient terms shared by the related documents. At 523, relevance scores of the synthetic document with the synthetic term, the search term A and the other salient terms in T are obtained. Because the document is synthesized, theses relevance scores may be set to a desired value. At 524, a column is added to the matrix $X_2$ that includes the relevance scores of the synthetic document with the terms in T to obtain a third modified matrix $X_3$. Subset T' is used to denote a subset of T which includes the terms of high interest, in this part of the example T' includes the search terms and the synthetic term. The relevance score with those terms of T that are not in T' is set to 0. At 525, the values in the third modified matrix $X_3$ are used for responding to future queries. The third modified matrix may return previously provided documents in response to a current query; it may also return previous similar queries in response to the current query. At 526, the method ends.

Aspects of the present invention work on the index phase of a search engine. Namely, as the user browses around, the method adjusts the scores and adds synthetic terms and documents to end up with an augmented term-document matrix on which LSI can be run. When the user makes a query in the future, this augmented matrix is used as-is and none of the processing described in the invention is required as part of the query phase. At 525, $X_3$ may be used for LSI.

Any of the modified search indices may be constructed based on the user-generated metadata from past queries of one or more users and may be used to respond to future queries by the same or other users.

In one exemplary embodiment, a text matching search engine takes a term and a document as parameters, and returns documents based on a computed relevance score. On an abstract level, this term-document score can be represented as the 2-dimensional matrix, $X_0$, with columns indicating documents and rows indicating the search terms. For example, m terms and n documents result in an m×n relevance score matrix which is also called a term-document matrix. The values in the matrix $X_0$ are the search engine relevance scores for particular term-document pairs:

$$X_0 = \begin{pmatrix} x_{1,1} & \cdots & x_{1,j} & \cdots & x_{1,n} \\ \vdots & \ddots & \vdots & & \vdots \\ x_{i,1} & \cdots & x_{i,j} & \cdots & x_{i,n} \\ \vdots & & \vdots & \ddots & \vdots \\ x_{m,1} & \cdots & x_{m,j} & \cdots & x_{m,n} \end{pmatrix} \leftarrow t_i^T$$

$$\downarrow d_j$$

In matrix $X_0$, the row $t_i^T$ is the score vector for the $i^{th}$ term, and the column $d_j$ is the score vector for the $j^{th}$ document.

$X_0$ is the initial search index or the initial term-document matrix. The columns of $X_0$ correspond to the set of documents in a corpus D of document and the rows of $X_0$ correspond to the set T of salient terms within the documents of corpus D. $X_0$ is the general term-document matrix, ready to be searched for any term, and return any document. The matrix $X_0$ shows relevance of many terms and many documents whereas the scores for the search terms are a subset of $X_0$ and therefore the related or discovered documents are a subset of the documents that form the matrix as well. In this case, a search for "A" on $X_0$ would return the subset {A, ACFJ, AZ, AGH, AGIX} because these are the documents that directly matched this query.

Within the matrix $X_0$, some of the columns belong to a cluster of related documents, D', and some of the rows belong to a set T' of salient terms that form a subset of T. These columns and rows are identified. In the example shown with matrices $X_0$, $X_1$, $X_2$ and $X_3$, the two sets for the corpus D and cluster D' are the same. However, usually, D' is much smaller than D. The subset T' may include only the search term entered by the user and not all of the salient terms.

After identifying the cluster of related documents, D', and the corresponding subset of salient terms, T', the values in the matrix $X_0$ are changed in one or more of the following ways:

1. The values $\{x_{i,j}: t_i \in T' \land d_j \in D'\}$ are increased. The magnitude of this increase depends on the details of the search engine. These values are increased to distinguish the cross section of the documents in D' and terms in T' from the remainder of the elements in the relevance matrix. By increasing the values where this document cluster intersects this term cluster, the chances of those documents being returned in response to a search conducted for one of those terms are boosted. For example, if a search is re-conducted for the term "Marin", the user may receive 50 documents, whereas only 5 of these 50 were returned on the original results page. Aspects of this invention would increase the similarity value between "Marin" and all 50 of those documents, so that next time a search is conducted for "Marin," the user obtains more than 5 of those documents directly on the results page.

Because not all of the elements of $X_0$ correspond to the documents in the set D' and the terms in the set T', the elements corresponding to the intersection of the related documents D' and the subset T' of the salient terms are increased to distinguish the intersection of D' and T' in matrix $X_0$. The matrix elements that are increased may be increased by a constant amount or by different amounts. For example, the elements may be increased by different amounts such that the resulting elements have the same value. The resulting modified matrix is called $X_1$. In one exemplary $X_1$ all of the $x_{i,j}$ for i=1 may be set to a value a which is greater than $x_{1,j}$ prior to this step. In the exemplary matrix shown below, the values of $x_{i,j}$ for i=1 are increased by a constant amount a.

$$X_1 = \begin{pmatrix} x_{1,1}+a & \cdots & x_{1,j}+a & \cdots & x_{1,n}+a \\ \vdots & \ddots & \vdots & & \vdots \\ x_{i,1} & \cdots & x_{i,j} & \cdots & x_{i,n} \\ \vdots & & \vdots & \ddots & \vdots \\ x_{m,1} & \cdots & x_{m,j} & \cdots & x_{m,n} \end{pmatrix} \leftarrow t_i^T$$

$$\downarrow d_j$$

In the above example D'=D and therefore the value a is added to all of the columns $d_j$.

2. A row corresponding to a synthetic term $t_{m+1}$ is added to the matrix $X_1$. This synthetic term is synthesized such that a user query will not include the term. Then, the relevance score pertaining to this term is calculated from equation (2):

$$x_{m+1,j} = \begin{cases} s(d_j), d_j \in D' & D' \subset D \\ 0, & \text{otherwise} \end{cases} \quad (2)$$

According to equation 2, the relevance score x for the synthetic term which is the $(m+1)^{th}$ term, and the $j_{th}$ document $d_i$ is $s(d_j)$ if the document belongs to the cluster of related documents D' and is 0 if the document does not belong to D'. The score $s(d_j)$ is a function which controls the weight of this synthetic term and is dependent on the details of the particular search engine being used. However, in general, as $s(d_j)$ increases, so does the strength of association between the documents in D'. The synthetic term is the $(m+1)^{th}$ term and its relevance scores $x_{m+1,j}$ are placed as a new $(m+1)^{th}$ row appended to the m×n matrix $X_1$. The resulting modified matrix that has one additional row is called $X_2$. In one exemplary modified matrix $X_2$, the synthetic term is $\tau$ and the relevance score of this synthetic term to all of the documents in D' is a constant value b:

$$X_2 = \begin{pmatrix} x_{1,1}+a & \cdots & x_{1,j}+a & \cdots & x_{1,n}+a \\ \vdots & \ddots & \vdots & & \vdots \\ x_{i,1} & \cdots & x_{i,j} & \cdots & x_{i,n} \\ \vdots & & \vdots & \ddots & \vdots \\ x_{m,1} & \cdots & x_{m,j} & \cdots & x_{m,n} \\ b & \cdots & b & \cdots & b \end{pmatrix} \leftarrow t_i^T$$

$$\downarrow d_j$$

In the above example D'=D and therefore the value b is entered for all of the columns $d_j$.

The synthetic term $\tau$ is also added to T' such that T''=T'+ $\{\tau\}$.

3. A synthetic document $d_{n+1}$ is added to the matrix, which is never returned as a result from a user query. Then, the relevance scores pertaining to this document are calculated from equation (3):

$$x_{i,n+1} = \begin{cases} s'(t_i), t_i \in T'' & T'' = T' + \{\tau\} \text{ and } T' \subset T \\ 0, & \text{otherwise} \end{cases} \quad (3)$$

The score value $s'(t_i)$ is analogous to $s(d_j)$, but determines the relevance score of synthetic document $d_{n+1}$ with each of the salient terms $t_i$ in T'' which includes the subset T' of all of the salient terms T and the synthetic term. The score $x_{i,n+1}$ shows the relevance of the term $t_i$ in row i of the score matrix X with the $(n+1)^{th}$ document, $d_{n+1}$, which is a synthetic document because the matrix $X_0$ had only n columns corresponding to n documents. The score $x_{i,n+1}$ is equal to the score value $s'(t_i)$ only if the term $t_i$ is one of the terms in T'', and 0 if the term $t_i$ is not found in T''. In other words, the synthetic document $d_{n+1}$ is synthesized to have a non-zero relevance with the terms in the subset T' and the synthetic term $\tau$ and no relevance to terms that do not belong to T' and are not $\tau$. The relevance scores of the synthetic document are then appended as an $(n+1)^{th}$ column to matrix $X_2$. The resulting modified matrix is called $X_3$ that has one additional column. While $X_0$ was an m×n matrix, $X_3$ is an (m+1)×(n+1) matrix. In one exemplary $X_3$ the synthetic document added is $\delta$ and the relevance score of this synthetic document with the term in the first row and with the synthetic term $\tau$ is set to a constant value of c. The synthetic document is synthesized to have a correlation of 0 with the other terms.

$$d_j$$
$$\downarrow$$
$$X_3 = \begin{pmatrix} x_{1,1}+a & \cdots & x_{1,j}+a & \cdots & x_{1,n}+a & c \\ \vdots & \ddots & \vdots & & \vdots & \vdots \\ x_{i,1} & \cdots & x_{i,j} & \cdots & x_{i,n} & 0 \\ \vdots & & \vdots & \ddots & \vdots & \vdots \\ x_{m,1} & \cdots & x_{m,j} & \cdots & x_{m,n} & 0 \\ b & \cdots & b & \cdots & b & c \end{pmatrix} \leftarrow t_i^T$$

Here T'={first term} and T''={first term, $\tau$}. In the following example, the first term is the search term "A."

The following examples show one application of the method described above. $X_0$ is considered to be the initial term-document matrix, which is the initial search index, for the browsing tree shown in FIG. 1. The initial search index $X_0$ is shown in Table 4.

There are nine documents, A, ACFJ, CFJ, FJX, AZ, AGH, AGIX, HXZ and XZ, in the corpus of documents D. Therefore, the matrix $X_0$ has 9 columns and j=1 ... 9. There are also 9 salient terms, A, C, F, G, H, I, J, X and Z, in the set of salient terms T. Therefore, i=1 ... 9. So, $X_0$ is an m×n=9×9 matrix.

Note that the document corresponding to the first column is a document that includes only the search term "A" and is added to show the relationship between the search term or search phrase "A" and the remaining salient terms.

Also, note that usually the initial search index is formed from relevance scores of all of the documents in a corpus of documents and their salient terms and is thus much larger than a matrix whose columns substantially correspond to the cluster of related and selected documents.

In this example D'=D such that the cluster of related documents and the corpus of documents searched are the same. Further, T'={A} and T''={A, $\tau$} while T={A, C, F, G, H, I, J, X, Z}.

As Table 4 shows, the relevance score between each term, for example J, and the documents including this term, for example ACFJ, CFJ and FJX, is 1 and the relevance score between each term and documents not including this term is 0.

To obtain the modified search index according to aspects of the present invention, first the score values are increased for terms $t_i$ with i=1 ... m and documents $d_j$ with j=1 ... n. Then, a synthetic term $t_{m+1}$ is added and the relevance score values of each of the documents $d_j$ in the set D' and this synthetic term are set to a value controlling the weight of the synthetic term. Last, a synthetic document $d_{n+1}$ is added and the relevance score values for the synthetic term $\tau$ and each of the terms $t_i$ in the set T' and this synthetic document are determined.

A simplified approach to performing the first step of the above process, increases the score $x_{i,j}$ by 1 to a maximum of 2 if $t_i \epsilon$T' and $d_j \epsilon$D'. Increasing $\{x_{i,j}:t_i\epsilon T' \wedge d_j \epsilon D'\}$ to a maximum of 2 results in the matrix $X_1$. The relevance scores 0 are increased to 1 and the relevance scores 1 are increased to 2 for the first row that corresponds to the search term "A." The subset T' was arbitrarily set to include only the search term "A" such that T'={A}. The magnitude of increase is also arbitrary. The score matrix $X_1$ is shown in Table 5.

TABLE 4

$X_0$: initial search index

| Term | Document | | | | | | | | |
|---|---|---|---|---|---|---|---|---|---|
| | A | ACFJ | CFJ | FJX | AZ | AGH | AGIX | HXZ | XZ |
| A | 1 | 1 | 0 | 0 | 1 | 1 | 1 | 0 | 0 |
| C | 0 | 1 | 1 | 0 | 0 | 0 | 0 | 0 | 0 |
| F | 0 | 1 | 1 | 1 | 0 | 0 | 0 | 0 | 0 |
| G | 0 | 0 | 0 | 0 | 0 | 1 | 1 | 0 | 0 |
| H | 0 | 0 | 0 | 0 | 0 | 1 | 0 | 1 | 0 |
| I | 0 | 0 | 0 | 0 | 0 | 0 | 1 | 0 | 0 |
| J | 0 | 1 | 1 | 1 | 0 | 0 | 0 | 0 | 0 |
| X | 0 | 0 | 0 | 1 | 0 | 0 | 1 | 1 | 1 |
| Z | 0 | 0 | 0 | 0 | 1 | 0 | 0 | 1 | 1 |

TABLE 5

$X_1$: first modified search index

| Term | Document | | | | | | | | |
|---|---|---|---|---|---|---|---|---|---|
| | A | ACFJ | CFJ | FJX | AZ | AGH | AGIX | HXZ | XZ |
| A | 2 | 2 | 1 | 1 | 2 | 2 | 2 | 1 | 1 |
| C | 0 | 1 | 1 | 0 | 0 | 0 | 0 | 0 | 0 |
| F | 0 | 1 | 1 | 1 | 0 | 0 | 0 | 0 | 0 |
| G | 0 | 0 | 0 | 0 | 0 | 1 | 1 | 0 | 0 |
| H | 0 | 0 | 0 | 0 | 0 | 1 | 0 | 1 | 0 |
| I | 0 | 0 | 0 | 0 | 0 | 0 | 1 | 0 | 0 |
| J | 0 | 1 | 1 | 1 | 0 | 0 | 0 | 0 | 0 |
| X | 0 | 0 | 0 | 1 | 0 | 0 | 1 | 1 | 1 |
| Z | 0 | 0 | 0 | 0 | 1 | 0 | 0 | 1 | 1 |

Next, a synthetic term, τ, is added to each of the documents in D' and to the list of salient terms T. A score matrix $X_2$ resulting from the second step of the method, namely adding the synthetic term τ, is shown in Table 6. The score value determining the relevance of all of the documents $d_j$ in D' and the synthetic term is set to $s(d_j)=2$ for the sake of clarity of description.

TABLE 6

$X_2$: second modified search index

| Term | Document |   |   |   |   |   |   |   |   |
|------|---|---|---|---|---|---|---|---|---|
|      | A | ACFJ | CFJ | FJX | AZ | AGH | AGIX | HXZ | XZ |
| A | 2 | 2 | 1 | 1 | 2 | 2 | 2 | 1 | 1 |
| C | 0 | 1 | 1 | 0 | 0 | 0 | 0 | 0 | 0 |
| F | 0 | 1 | 1 | 1 | 0 | 0 | 0 | 0 | 0 |
| G | 0 | 0 | 0 | 0 | 0 | 1 | 1 | 0 | 0 |
| H | 0 | 0 | 0 | 0 | 0 | 1 | 0 | 1 | 0 |
| I | 0 | 0 | 0 | 0 | 0 | 0 | 1 | 0 | 0 |
| J | 0 | 1 | 1 | 1 | 0 | 0 | 0 | 0 | 0 |
| X | 0 | 0 | 0 | 1 | 0 | 0 | 1 | 1 | 1 |
| Z | 0 | 0 | 0 | 0 | 1 | 0 | 0 | 1 | 1 |
| τ | 2 | 2 | 2 | 2 | 2 | 2 | 2 | 2 | 2 |

In the example shown above, the score value determining the relevance of the synthetic term τ with all of the existing documents in D' is set to 2 and D'=D. Therefore, the last row, $m+1=10^{th}$ row, of the matrix is filled with the value $s(d_j)=2$ for j=1 ... n and n=9.

The final step, adding a synthetic document, δ, yields the matrix $X_3$ that is shown in Table 7. In the exemplary case shown, the score value $s'(t_i)=2$ for i=1 and i=m+1 where m=9 and $s'(t_i)=0$ for i=2 ... m.

TABLE 7

$X_3$: third modified search index

| Term | Document |   |   |   |   |   |   |   |   |   |
|------|---|---|---|---|---|---|---|---|---|---|
|      | A | ACFJ | CFJ | FJX | AZ | AGH | AGIX | HXZ | XZ | δ |
| A | 2 | 2 | 1 | 1 | 2 | 2 | 2 | 1 | 1 | 2 |
| C | 0 | 1 | 1 | 0 | 0 | 0 | 0 | 0 | 0 | 0 |
| F | 0 | 1 | 1 | 1 | 0 | 0 | 0 | 0 | 0 | 0 |
| G | 0 | 0 | 0 | 0 | 0 | 1 | 1 | 0 | 0 | 0 |
| H | 0 | 0 | 0 | 0 | 0 | 1 | 0 | 1 | 0 | 0 |
| I | 0 | 0 | 0 | 0 | 0 | 0 | 1 | 0 | 0 | 0 |
| J | 0 | 1 | 1 | 1 | 0 | 0 | 0 | 0 | 0 | 0 |
| X | 0 | 0 | 0 | 1 | 0 | 0 | 1 | 1 | 1 | 0 |
| Z | 0 | 0 | 0 | 0 | 1 | 0 | 0 | 1 | 1 | 0 |
| τ | 2 | 2 | 2 | 2 | 2 | 2 | 2 | 2 | 2 | 2 |

An $n+1=10^{th}$ column is added for the synthetic document δ. The synthetic document δ has a relevance score value of 2 with the search term A and the synthetic term τ and its relevance with the other salient terms, C, F, G, H, I, J, X and Z, is 0.

$X_3$ is a more useful scoring matrix than $X_0$ for a number of reasons. First, all the documents in D' are now associated with some of the salient terms, T', so that these documents will now show up in repeated user searches for these terms. While, all the documents in D' are now also associated with the synthetic term τ, the synthetic term, τ, is a wholly internal construct, which the user may never know about, and will not be able to search for directly. Second, $X_3$ represents latent associations between and amongst D' and T', which is useful when performing Latent Semantic Indexing (LSI).

For example, from $X_3$, the documents CFJ, FJX, HXZ and XZ, can be returned which would have been absent from the results initially. The users may directly view their clusters of documents: each cluster is grouped together by a synthetic term, so that a user could request "documents like this." Terms can also be associated with one another, via synthetic documents, to allow for "related queries."

LSI analytically identifies the natural associations and linkages between terms and documents, but it does so only from the textual content of documents. The synthetic terms and documents, described by the aspects of the present invention, are basically a way to drop hints to LSI about the personal associations a particular user has demonstrated through user behavior. The goal behind this adjustment of similarity scores and insertion of synthetic entities is to feed into LSI.

Synergy with LSI

LSI decomposes the scoring matrix into a reduced rank matrix, introducing concepts as a layer of semantic abstraction between terms and documents. The synthetic terms and documents, and selectively increased scores lead LSI to create concepts around the latent associations that the above-described method recognizes.

The addition of synthetic terms and documents, as described by this invention, results in concepts being formed around the latent associations inferred from user-generated metadata. This tends to cluster associated document and term vectors in the concept space, and means the latent semantic associations that LSI attempts to infer will be more accurate. The benefits of this include better recommendations of "terms like these" and "documents like these", more accurate disambiguation of synonymy and polysemy, as well as more straightforward search results.

Scoping of Sessions

The method chosen to determine the document cluster, D', and salient term set, T', obviously depends on the data domain being operated upon, as well as the types of user-generated metadata available to the indexer. The example given above chose individual browsing trees of web pages reached from some ancestor to be D', while T' was the salient terms of the documents D' and A was the search terms entered at the root node. Other implementations and some extensions to the approach of the aspects of the present invention include the following:

Amalgamating several micro-sessions into one logical session, based on some combination of semantic similarity (perhaps approximated through keyword matching), time, user, location and so on. In domains where individual micro-sessions have a fine granularity, associating real and synthetic terms with documents from the union of the micro-sessions would help.

Salient keywords could be extracted from each of the documents in the cluster, and either recursively cascaded down to that document's children, potentially to a limited depth, or a common set of extra terms could be determined from the document cluster as a whole, with weighting to reflect the inferred importance of each salient term.

To depart from the limited example of pure web browsing, cross-application or even cross-device latent associations could be made by correlating the user identity, time and location parameters. This arrangement allows for the richer queries described above, such as "web pages I opened while reading this email" or "phone calls I received whilst at work".

Leveraging Other Users' Associations

The metadata built up by individual users hold significant value. Subject to appropriate privacy and access control, allowing users to leverage the knowledge base of their network while searching would allow non-experts to better find high-value documents in specific fields.

Exposing the entire scoring matrix of one user to another is possible, but may involve privacy concerns. An alternative is to expose some of the user-generated metadata, such as measured interest and document and term associations, between users. Sharing these implicit recommendations and connections results in searchable corpora tailored towards specific users' interests. Note that this extends the utility of user-generated metadata beyond what the user has already seen, onto documents they have yet to discover.

For example, suppose Alice is an expert on topic M. Bob knows very little about M and is struggling to find high value documents using conventional web searches. However, if Alice allows Bob to use her interest and association metadata while researching M, Bob finds interesting, pertinent documents more easily, and the latent associations between documents are more immediately obvious.

Alice could know Bob personally, through her personal network, through a social network, or Alice might not know Bob at all but allow anyone use her M-specific metadata.

A system where subject matter experts share their own know-how altruistically, or under a profit-sharing scheme, would catalyze this process of match-making knowledge consumers with knowledge providers.

Aggregating User-Generated Metadata

In addition to using specific users' metadata, aggregating the wider population's metadata helps search in the general case. For example, combining interest data across a multiplicity of users enables the re-ranking of search results to favor documents which are generally held to be of high value.

Hybrid Techniques

User-generated metadata could be considered in tandem with other metadata to produce hybrid algorithms. For example, the choices of links which people choose, or choose not to follow could be combined with PageRank™ metadata from conventional spidering systems to provide a personalized search service.

By analyzing the way that different users implicitly or explicitly rate pages, a user likeness system could determine commonalities of interest in the user population. Example applications of this user clustering metadata include the on-line connection of like-minded individuals, the creation of social search engines based around communities, and the implicit creation of network of peers around a user, to improve that user's search results and suggest new, high-value content.

Figure 6:
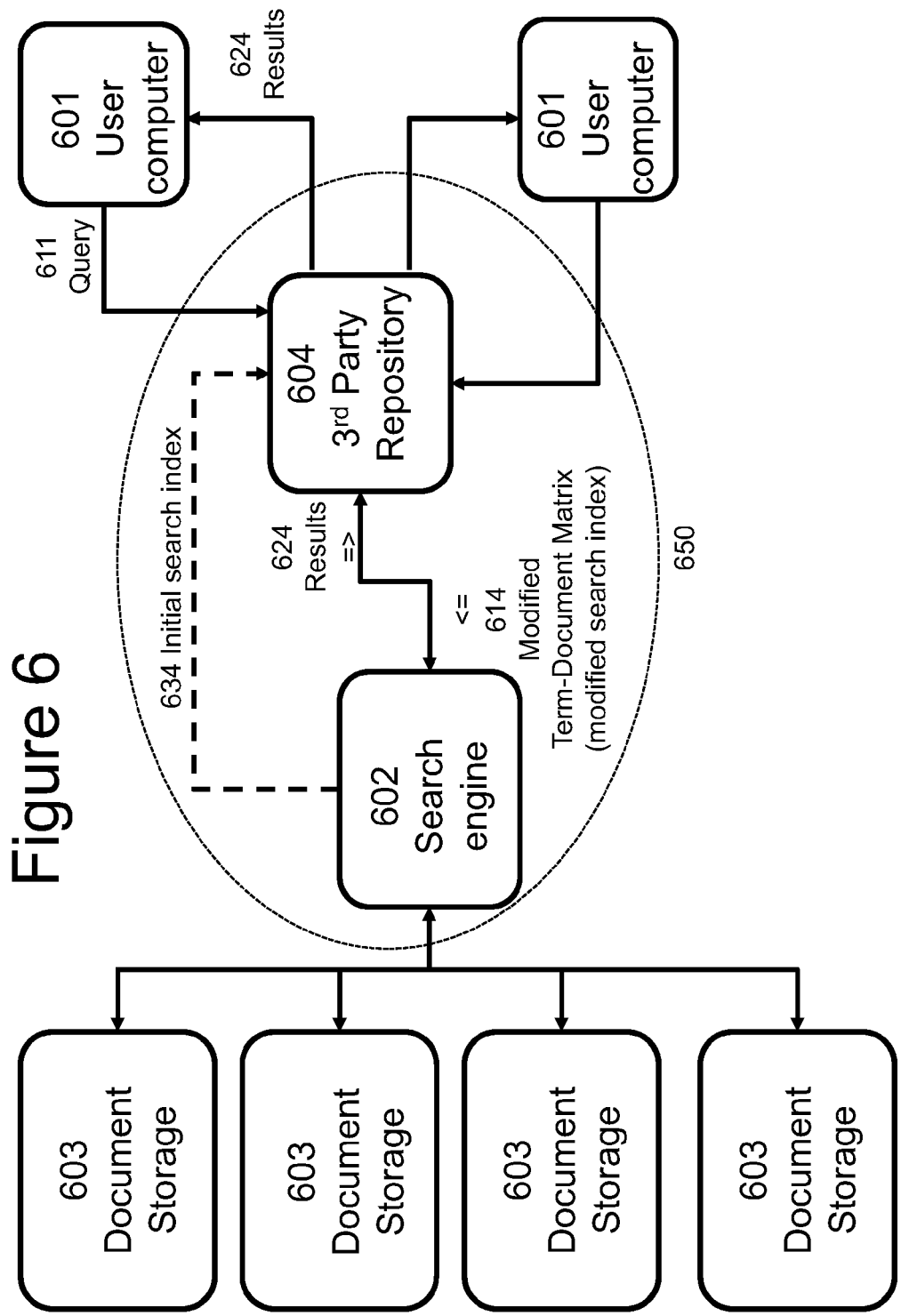
FIG. 6 shows a system, according to the aspects of the present invention.

FIG. 6 shows a system, according to the aspects of the present invention.

FIG. 6 shows one exemplary system according to aspects of the present invention. The system includes user computers 601, a search engine 602, document storage locations 603 and a $3^{rd}$ party repository 604. The user computers 601 send their queries 611 to the search engine 602 through the $3^{rd}$ party repository 604. The $3^{rd}$ party repository 604 stores each user's past history and preferences and is able to modify an initial search index according to a method, for example, as presented in FIG. 5A, FIG. 5B and FIG. 5C above, to arrive at a modified search index 614. The modified search index is a modified term-document matrix. The $3^{rd}$ party repository 604 uses the modified search index 614 to search through the search engine 602. The search engine 602 is able to use the modified search index 614 to search and retrieve documents from various document storage sources 603. The document storage sources 603 may be various servers or various databases on a same storage device. The results 624 are subsequently returned by the $3^{rd}$ party repository 604 to the user computer 601. The results 624 are generally documents that are determined to be of interest to the user and an appropriate response to his query. The $3^{rd}$ part repository 604 adds the result to the information that it contains about each user and to its collective information about all users. This information is used in arriving at the modified term-document matrix for future searches of this and other users. In this exemplary alternative, each user is capable of sharing his history and preferences with other users by employing the $3^{rd}$ party repository.

In one alternative, if the search engine providers are in cooperation with the repository owners, the initial search index 634 may be provided to the repository from the search engine and subsequently modified at the repository. In one alternative, the initial search index may be modified at the search engine. In the alternative considered in FIG. 6, the initial search index is formed and maintained by the operators of the repository.

The dashed oval 650 indicates that the modified term-document matrix of the repository is in effect the search engine to which the query is applied.

Figure 7:
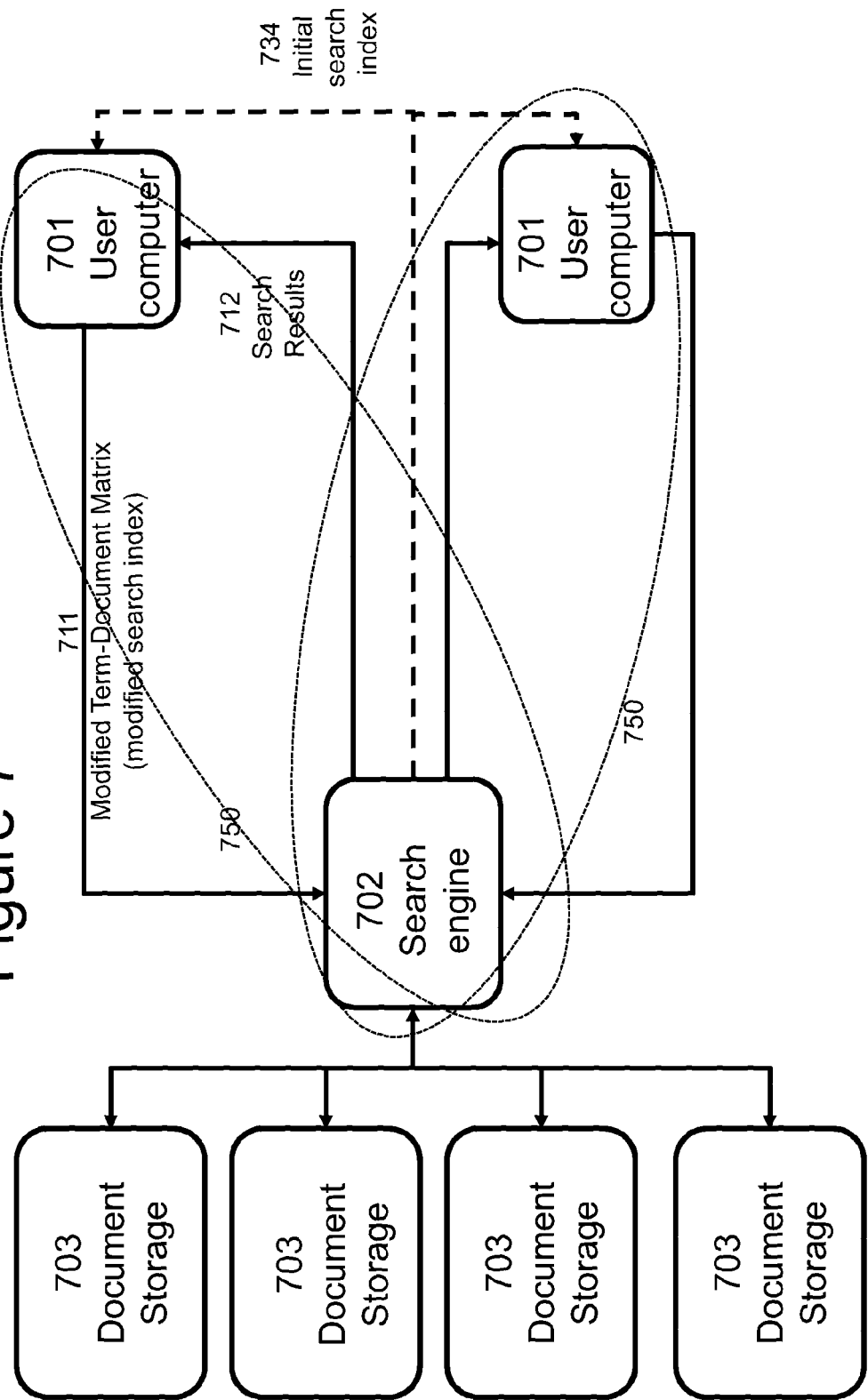
FIG. 7 shows an alternative system, according to the aspects of the present invention.

FIG. 7 shows an alternative system, according to the aspects of the present invention.

FIG. 7 shows another exemplary system according to aspects of the present invention. The system includes user computers 701, a search engine 702 and document storage locations 703. This alternative does not include a $3^{rd}$ party repository. User computers 701 send a modified search index 711, which is a modified term-document matrix, to the search engine 702 and the search engine 702 returns the results 712 to the user computers after searching the document storage locations 703. In this alternative no $3^{rd}$ party repository is used to store each user's past history and preferences. Instead, the initial search index is modified on the user computer 701 by replacing the initial term-document matrix with a modified term-document matrix 711 according to a method, for example, as presented in FIG. 5A, FIG. 5B and FIG. 5C above. The modified search index 711 is sent from the user computer 701 to the search engine 702. The search engine 702 is able to use the modified search index 711 to retrieve documents from various document storage sources 703. The document storage sources 703 may be various servers or various databases on a same storage device. With this alternative, each user has access only to his own past history and is not sharing his history with other users.

In one alternative, if the search engine providers consent to cooperation with the computer users, the initial search index 734 may be provided to the each user computer from the search engine and subsequently modified at the user computer. In one alternative, the initial search index may be modified at the search engine. In the alternative considered in FIG. 7, the initial search index is formed and maintained by each user computer.

The dashed ovals 750 indicate that the modified term-document matrices at the user computers are in effect the search engines to which the query is applied.

FIG. 5A, FIG. 5B and FIG. 5C showed one method of obtaining modified search indices. Alternative methods of arriving at modified search indices are shown in FIG. 8, FIG. 9 and FIG. 10.

FIG. 8 shows a flowchart of a method for obtaining a modified search index by using the search term, according to the aspects of the present invention.

The method begins as 801. At 802 a query is received from a user. At 803, an initial search index $X_{00}$ is obtained from an external source. This search index may have been formed internally at an earlier time. The initial search index $X_{00}$ may be embodied in a term-document matrix whose elements are relevance scores between a set of documents in a corpus of document and a set of salient terms found in those documents. At 804, subsets of the term-document matrix $X_{00}$ are identified as the rows and columns corresponding to a cluster of documents related to the query. For example, the subsets may be formed from the rows that correspond to the search terms of the query and the columns that correspond to the documents viewed earlier as a result of a search for these terms. At 805, the relevance scores corresponding to the identified subsets are increased in the initial term-document matrix $X_{00}$ to obtain a new term-document matrix. The resulting term-document matrix $X_{11}$ is a modified search index. At 806, the modified search index $X_{11}$ can be used for subsequent responses to same or similar queries by this user. Other uses who value the opinion of this user or are somehow related to this user may benefit from this modified search index. When a number of users are related or associated, the modified search index may represent the choices made by any or all of these users. At 807, the method ends.

FIG. 9 shows a flowchart of a method for obtaining a modified search index by using a synthetic term, according to the aspects of the present invention.

The method begins as 901. At 902 an initial search index $X_{00}$ is either obtained from an external source or formed internally. The initial search index $X_{00}$ may be embodied in a term-document matrix whose elements are relevance scores between a set of documents in a corpus of document and a set of salient terms found in those documents. At 903, a synthetic term is synthesized that is not normally and naturally present in any document of the corpus. Yet, this term is synthesized to have a high relevance score with a cluster of documents related by having been returned in response to a particular query or a set of similar queries. As such, the inclusion of this synthetic term in the formation of the index highlights the relationship between these certain documents. At 904, the relevance scores of the new synthesized term with the documents of the corpus are obtained. This term was synthesized to have a high relevance to at least some of the documents and therefore the relevance score of the synthetic term with some of these documents is effectively preset. At 905, the relevance scores showing the relevance of the synthetic term and the documents in the initial term-document matrix $X_{00}$ are added to $X_{00}$ to obtain a new term-document matrix. The resulting term-document matrix $X_{22}$ is a modified search index. At 906, the modified search index $X_{22}$ can be used for subsequent searches. This modified search index substantially returns the previous cluster of related documents in response to future queries similar to the particular query that was used to form the synthetic term. The search index is modified, while the user's query remains unmodified. At 907, the method ends.

FIG. 10 shows a flowchart of a method for obtaining a modified search index by using a synthetic document, according to the aspects of the present invention.

The method begins as 1001. At 1002 an initial search index $X_{00}$ is either obtained from an external source or formed internally. At 1003, a synthetic document is synthesized that is not normally and naturally present in any set of documents but ties together salient terms of a cluster of related documents returned in response to a query. This document is synthesized to have a high relevance score with the search terms of the query that was previously used by a current user or other users somehow associated with the current user or his interests. The relationship of this synthetic document with certain search terms, highlights the documents that are associated with those terms as well. At 1004, the relevance scores of the new synthesized document with the terms used for formation of the initial search index are obtained. This document was synthesized to have a high relevance to at least some of the terms and therefore the relevance score of the synthetic document with some of these terms is effectively preset. At 1005, the relevance scores showing the relevance of the synthetic document and the terms in the initial term-document matrix $X_{00}$ are added to $X_{00}$ to obtain a new term-document matrix. The resulting term-document matrix $X_{33}$ is a modified search index. At 1006, the modified search index $X_{33}$ can be used for subsequent searches. Because the search index is modified, user's query may remain unmodified. This modified search index may be used to retrieve queries similar to the query that was used for the formation of the modified search index or to retrieve the results of those queries. At 1007, the method ends.

Aspects of the present invention provide a method to utilize user-generated metadata to improve IR. An exemplary implementation is described which increases selected term-document scores and introduces synthetic entries into the scoring matrix. This serves to reflect real-world associations in the search engine index, and favors documents that are inferred as being those to which the users attach the most value.

When using the methods and systems of the present invention:
  re-finding documents is considerably easier than discovering them,
  re-finding high value documents is especially easy, and
  discovering new high value documents is easier.

The scope of this method spans IR. As it describes an approach to capture, store and expose index-time context for users, it is applicable to any IR domain in which indexing occurs, and user-generated metadata is available.

Aspects of the present invention may be implemented using a general purpose computer having an input and output interface including a keyboard, a mouse, a screen, a microphone and a camera, a processor, a permanent storage medium such as a hard disk and ports for interfacing with the internet and other local or wide area networks. Aspects of the present invention may be implemented on special purpose computers and servers as well.

The present invention has been described in relation to particular examples, which are intended to be illustrative rather than restrictive, with the scope and spirit of the invention being indicated by the following claims and their equivalents.

The invention claimed is:

1. A computer-implemented method for improving information retrieval in response to a query input by a user to a user computer during a browsing session, the method comprising:
  collecting user-generated metadata indicative of user choices regarding documents returned responsive to a prior query;
  storing the user-generated metadata on a storage medium;
  modifying an initial search index with the user-generated metadata to obtain a modified search index, by a computer processor; and
  storing the modified search index,
  wherein the initial search index is an initial term-document matrix having relevance scores as elements, the relevance scores indicating relationship of salient terms of documents in a corpus to the documents in the corpus, and
  wherein the modified search index is obtained by modifying the initial term-document matrix to highlight the relationship between documents related to the user-generated metadata and a subset of the salient terms.

2. The method of claim 1,
wherein the user-generated metadata includes a set of user-selected documents, a set of salient terms of the user-selected documents and measured user interest in each of the user-selected documents, and
wherein the user-selected documents consist of documents selected by one or more users during one or more browsing sessions.

3. The method of claim 1, wherein the modified search index includes relevance scores pertaining to a synthetic term associating together user-selected documents,
wherein the modified search index includes relevance scores pertaining to a synthetic document associating together salient terms of the user-selected documents,
wherein the user-selected documents are selected from among discovered documents returned responsive to the prior query, and
wherein the synthetic document does not occur in the corpus and the synthetic term does not occur in the documents of the corpus.

4. The method of claim 1, further comprising:
applying the query to the modified search index; and
providing a set of discovered documents selected from the corpus to the user at a user interface responsive to the query.

5. The method of claim 4, wherein the set of discovered documents is further reflective of textual similarity.

6. The method of claim 1, further comprising:
collecting user interest data by monitoring prior browsing sessions; and
incorporating the user interest data in the obtaining of the modified search index by further modifying the initial term-document matrix according to the user interest data.

7. The method of claim 1, further comprising:
applying the modified search index to latent semantic indexing.

8. The method of claim 1, wherein the modifying of the initial search index with the user-generated metadata to obtain the modified search index, includes:
Identifying one or more first subsets of the initial term-document matrix from columns and rows corresponding to first documents and first salient terms; and
increasing value of elements of the first subsets to obtain a first modified term-document matrix,
wherein the modified term-document matrix is set equal to the first modified term-document matrix,
wherein the first documents are a cluster of related documents, and
wherein the first salient terms are a subset of the salient terms.

9. The method of claim 8,
wherein the first salient terms consist of search terms of the prior query.

10. The method of claim 8, wherein the modifying of the initial search index with the user-generated metadata to obtain the modified search index further includes:
synthesizing a synthetic term associating the first documents together;
obtaining relevance scores of the synthetic term with the documents of the corpus;
adding relevance scores for the synthetic term to the first modified term-document matrix to obtain a second modified term-document matrix; and
adding the synthetic term to the first salient terms,
wherein the modified term-document matrix is set equal to the second modified term-document matrix.

11. The method of claim 10, wherein the modifying of the initial search index with the user-generated metadata to obtain the modified search index further includes:
synthesizing a synthetic document associating the first salient terms together;
obtaining relevance scores of the synthetic document with the salient terms; and
adding relevance scores for the synthetic document to third term-document matrix to obtain a fourth term-document matrix,
wherein the modified term-document matrix is set equal to the third modified term-document matrix.

12. The method of claim 11,
wherein the synthetic term is synthesized to have relevance scores with the first documents that are higher than relevance scores of the synthetic term with other documents in the corpus, and
wherein the synthetic document is synthesized to have relevance scores with the first salient terms that are higher than relevance scores of the synthetic document with the other salient terms.

13. The method of claim 11, wherein the first salient terms consist of the search terms and the synthetic term.

14. The method of claim 1, wherein the user-generated metadata is stored at the user computer.

15. The method of claim 1, wherein the user-generated metadata is stored at a third party repository.

16. The method of claim 1, wherein the initial search index is obtained from an external source.

17. The method of claim 1, wherein the initial search index is internally formed.

18. The method of claim 1, wherein the user-generated metadata is indicative of user choices from previous browsing sessions of the user.

19. The method of claim 1, wherein the user-generated metadata is indicative of user choices from previous browsing sessions of the user and other users.

20. A computer-implemented method for information retrieval in response to a present query input by a user to a user computer, the method comprising:
obtaining an initial term-document matrix having relevance scores as elements, the relevance scores indicating relationship of salient terms of documents in a corpus to the documents in the corpus;
collecting and storing user-generated metadata identifying first documents related together through previous user selections or previous user interests or both;
synthesizing a synthetic term associating the first documents together;
obtaining relevance scores of the synthetic term with the documents in the corpus; and
adding the relevance scores of the synthetic term to the initial term-document matrix to obtain a modified term-document matrix.

21. The method of claim 20, wherein the synthetic term is synthesized to have a high relevance score with the first documents.

22. The method of claim 20, wherein the obtaining of the relevance scores of the synthetic term with the documents in the corpus includes setting the relevance scores of the synthetic term with the documents in the corpus.

23. The method of claim 20, further comprising:
receiving the present query;
applying the present query to the modified term-document matrix to obtain present query results; and
providing the present query results to the user.

24. The method of claim 20, further comprising:
applying the modified term-document matrix to latent semantic indexing.

25. A computer-implemented method for information retrieval in response to a present query input by a user to a user computer, the method comprising:
obtaining an initial term-document matrix having relevance scores as elements, the relevance scores indicating relationship of salient terms of documents in a corpus to the documents;
collecting and storing user-generated metadata identifying first documents related together through previous user selections or previous user interests or both;
identifying first salient terms as a subset of salient terms of the first documents;
synthesizing a synthetic document associating the first documents together through associating the first salient terms together;
obtaining relevance scores of the synthetic document with the salient terms of the documents in the corpus; and
adding the relevance scores of the synthetic document to the initial term-document matrix to obtain a modified term-document matrix.

26. The method of claim 25, wherein the synthetic document is synthesized to have a high relevance score with the first salient terms.

27. The method of claim 25, wherein the obtaining of the relevance scores of the synthetic document with the salient terms of the documents in the corpus includes setting the relevance scores of the synthetic document with the salient terms of the documents in the corpus.

28. The method of claim 25, wherein the first salient terms consist of search terms of the present query, the method further comprising:
receiving the present query;
applying the present query to the modified term-document matrix to obtain present query results; and
providing the present query results to the user.

29. The method of claim 25, further comprising:
applying the modified term-document matrix to latent semantic indexing.

30. A device for improving information retrieval in response to a query by a user, the device comprising:
means for receiving an initial search index showing relevance of documents in a corpus of searched document to salient terms of the documents;
means for collecting and storing user-generated metadata indicative of user choices during a document search session;
means for modifying the initial search index according to the user-generated metadata to obtain a modified search index;
means for applying the query to the modified search index; and
means for providing a set of documents discovered from the corpus of searched documents responsive to the query,
wherein user-selected documents are chosen by the user from among the discovered documents, and
wherein the modified search index is obtained by modifying the initial search index to emphasize a relationship between the user-selected documents and a subset of salient terms of the user-selected documents.

31. The device of claim 30, wherein the user-generated metadata indicates a set of salient terms of the user-selected documents and measured user interest in each of the user-selected documents in addition to the user-selected documents.

32. The device of claim 30, wherein the user-selected documents consist of documents selected by one or more users during one or more document search sessions.

33. The device of claim 30, wherein the modified search index includes relevance scores pertaining to a synthetic document associating together the salient terms of the user-selected documents, and
wherein the synthetic document does not occur in the corpus.

34. The device of claim 33,
wherein the modified search index includes relevance scores pertaining to a synthetic term associating together the user-selected documents, and
wherein the synthetic term does not occur in the documents of the corpus.

35. A repository for collecting user-generated metadata and generating a modified search index, the repository comprising:
an input and output interface for receiving an initial search index;
a storage medium for storing the initial search index and for storing user-generated metadata indicative of user choices during a browsing session; and
a processor for modifying the initial search index according to the user-generated metadata to generate the modified search index,
wherein the modified search index is generated by modifying the initial search index to emphasize a relationship between user-selected documents and a subset of salient terms of the user-selected documents,
wherein the user-selected documents are chosen from among documents returned to a user during the browsing session;
wherein the modified search index includes relevance scores pertaining to a synthetic term associating together the user-selected documents, and
wherein the synthetic term does not occur in documents of a corpus of searched documents.

36. The repository of claim 35, wherein the modified search index includes relevance scores pertaining to a synthetic document associating together the salient terms of the user-selected documents, and wherein the synthetic document does not occur in the corpus of searched documents.

* * * * *